United States Patent
Sasaki et al.

(10) Patent No.: US 9,733,986 B2
(45) Date of Patent: Aug. 15, 2017

(54) COMPUTER SYSTEM AND VIRTUAL MACHINE ARRANGING METHOD

(71) Applicant: FUJITSU LIMITED, Kawasaki-shi, Kanagawa (JP)

(72) Inventors: Tomotake Sasaki, Kawasaki (JP); Yuichi Sato, Yamato (JP); Hiroki Kobayashi, Kawasaki (JP); Sachio Kobayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 351 days.

(21) Appl. No.: 14/223,155

(22) Filed: Mar. 24, 2014

(65) Prior Publication Data

US 2014/0208322 A1    Jul. 24, 2014

Related U.S. Application Data

(63) Continuation of application No. PCT/JP2012/073544, filed on Sep. 13, 2012.

(30) Foreign Application Priority Data

Sep. 22, 2011 (WO) .................. PCT/JP2011/071737
Oct. 18, 2011 (WO) .................. PCT/JP2011/073973

(51) Int. Cl.
*G06F 9/50* (2006.01)
*G06F 9/455* (2006.01)

(52) U.S. Cl.
CPC ........ *G06F 9/5077* (2013.01); *G06F 9/45558* (2013.01); *G06F 9/5094* (2013.01); *G06F 2009/4557* (2013.01); *Y02B 60/142* (2013.01)

(58) Field of Classification Search
CPC ............... G06F 9/5077; G06F 9/4856; G06F 2009/4557; G06F 2009/45575; G06F 11/1484

(Continued)

(56) References Cited

U.S. PATENT DOCUMENTS 7,861,102 B1 * 12/2010 Ranganathan ........ G06F 1/3206
                                                                713/300
9,098,214 B1 *  8/2015 Vincent .................... G06F 8/10
(Continued)

FOREIGN PATENT DOCUMENTS

JP       6-141468       5/1994
JP    2004-192612       7/2004
(Continued)

OTHER PUBLICATIONS

PCT International Preliminary Report on Patentability mailed Apr. 3, 2014 in corresponding International Application No. PCT/JP2012/073544.

(Continued)

*Primary Examiner* — Thomas Lee
*Assistant Examiner* — Santosh R Poudel
(74) *Attorney, Agent, or Firm* — Staas & Halsey LLP

(57) ABSTRACT

A computer system includes plural servers in which virtual machines are arranged; plural power supply apparatuses that supply electric power to the servers; and a control apparatus that controls arrangement of the virtual machines in the servers. The control apparatus solves an integer programming problem whose objective function is total power consumption by the servers and by the power supply apparatuses, the total power consumption being described as a function of the arrangement of the virtual machines; and arranges the virtual machines based on a solution of the integer programming problem.

24 Claims, 21 Drawing Sheets

(58) Field of Classification Search
USPC .................................................. 713/300, 320
See application file for complete search history.

(56) References Cited

U.S. PATENT DOCUMENTS

| | | | |
|---|---|---|---|
| 2004/0111596 A1 | 6/2004 | Rawson | |
| 2009/0138887 A1 | 5/2009 | Uehara et al. | |
| 2009/0150528 A1* | 6/2009 | Tanabe | H04L 41/0883 709/221 |
| 2009/0259345 A1* | 10/2009 | Kato | G06F 1/20 700/295 |
| 2010/0250192 A1* | 9/2010 | Deokar | H02J 9/061 702/182 |
| 2011/0016342 A1* | 1/2011 | Rowan | G06F 11/3006 713/340 |
| 2011/0099403 A1 | 4/2011 | Miyata et al. | |
| 2011/0126206 A1 | 5/2011 | Kato et al. | |
| 2011/0239010 A1* | 9/2011 | Jain | G06F 1/3209 713/310 |
| 2011/0264418 A1* | 10/2011 | Szewczyk | H02J 13/0006 703/2 |
| 2012/0204051 A1 | 8/2012 | Murakami et al. | |
| 2013/0042003 A1* | 2/2013 | Franco | H04L 67/1097 709/226 |

FOREIGN PATENT DOCUMENTS

| | | |
|---|---|---|
| JP | 2008-217302 | 9/2008 |
| JP | 2009-151745 | 7/2009 |
| JP | 2009-252056 | 10/2009 |
| JP | 2010-190108 | 9/2010 |
| JP | 2010-205200 | 9/2010 |
| JP | 2011-8822 | 1/2011 |
| JP | 2011-13822 | 1/2011 |
| JP | 2011-39889 | 2/2011 |
| JP | 2011-82799 | 4/2011 |
| JP | 2011-90594 | 5/2011 |

OTHER PUBLICATIONS

International Search Report mailed Oct. 9, 2012, in corresponding International Application No. PCT/JP2011/073544.

Japanese Office Action dated Dec. 1, 2015 in corresponding Japanese Patent Application No. 2013-534691.

* cited by examiner

FIG.4

| NUMBER OF RACKS | NUMBER OF SERVERS/RACK |
|---|---|
| N | S |

FIG.5

| NUMBER OF VIRTUAL MACHINES |
|---|
| M |

FIG.6

| SCALING FACTOR |
|---|
| C |

FIG.7

| NUMBER | 1 | ... | S |
|---|---|---|---|
| 1 | $L_{11}$ | ... | $L_{1S}$ |
| ⋮ | ⋮ | ... | ⋮ |
| N | $L_{N1}$ | ... | $L_{NS}$ |

FIG.8

| NUMBER | 1 | ... | S |
|---|---|---|---|
| 1 | $a_{11}$ | ... | $a_{1S}$ |
| ⋮ | ⋮ | ... | ⋮ |
| N | $a_{N1}$ | ... | $a_{NS}$ |

FIG.9

| NUMBER | 1 | ... | S |
|---|---|---|---|
| 1 | $\beta_{11}$ | ... | $\beta_{1S}$ |
| ⋮ | ⋮ | ... | ⋮ |
| N | $\beta_{N1}$ | ... | $\beta_{NS}$ |

FIG.10

| NUMBER | 1 | ... | S |
|---|---|---|---|
| 1 | $Y^-_{11}$ | ... | $Y^-_{1S}$ |
| ⋮ | ⋮ | ... | ⋮ |
| N | $Y^-_{N1}$ | ... | $Y^-_{NS}$ |

FIG.11

| NUMBER | 1 | ... | S |
|---|---|---|---|
| 1 | $Y^+_{11}$ | ... | $Y^+_{1S}$ |
| ⋮ | ⋮ | ... | ⋮ |
| N | $Y^+_{N1}$ | ... | $Y^+_{NS}$ |

FIG.12

| NUMBER | 1 | ... | S |
|---|---|---|---|
| 1 | $w_{11}[0]$ | ... | $w_{1S}[0]$ |
| ⋮ | ⋮ | ... | ⋮ |
| N | $w_{N1}[0]$ | ... | $w_{NS}[0]$ |

FIG.13

| NUMBER | BASE POWER CONSUMPTION | PROPORTIONALITY COEFFICIENT |
|---|---|---|
| 1 | $\eta_1$ | $\varepsilon_1$ |
| ⋮ | ⋮ | ⋮ |
| N | $\eta_N$ | $\varepsilon_N$ |

| NUMBER | SIZE OF VIRTUAL MACHINE |
|--------|-------------------------|
| 1 | $T_1$ |
| ⋮ | ⋮ |
| n | $T_n$ |
| ⋮ | ⋮ |
| M | $T_M$ |

FIG.18

| NUMBER | 1 | ... | S |
|---|---|---|---|
| 1 | $w^0_{11}$ | ... | $w^0_{1S}$ |
| ⋮ | ⋮ | ... | ⋮ |
| N | $w^0_{N1}$ | ... | $w^0_{NS}$ |

FIG.19

| AIR CONDITIONING APPARATUS COUNT |
|---|
| C |

FIG.20

| NUMBER | BASE POWER CONSUMPTION | PROPORTIONALITY COEFFICIENT |
|---|---|---|
| 1 | $\lambda_1$ | $\mu_1$ |
| ⋮ | ⋮ | ⋮ |
| C | $\lambda_C$ | $\mu_C$ |

FIG.21

| NUMBER | PROPORTIONALITY COEFFICIENT |
|---|---|
| 1 | $\kappa_1$ |
| ⋮ | ⋮ |
| C | $\kappa_C$ |

FIG.22

| NUMBER | 1 | ⋯ | N |
|---|---|---|---|
| 1 | $\psi_{11}$ | ⋯ | $\psi_{1N}$ |
| ⋮ | ⋮ | ⋯ | ⋮ |
| C | $\psi_{C1}$ | ⋯ | $\psi_{CN}$ |

FIG.23

| NUMBER | SUPPLIED HEAT FLOW |
|---|---|
| 1 | $q_{sup,1}$ |
| ⋮ | ⋮ |
| N | $q_{sup,N}$ |

| NUMBER | 1 | ... | V |
|---|---|---|---|
| QUANTITY | $M_1$ | ... | $M_V$ |

| NUMBER | 1 | ... | V |
|---|---|---|---|
| 1 | $T_{11}$ | ... | $T_{V1}$ |
| ⋮ | ⋮ | ⋮ | ⋮ |
| M | $T_{1M}$ | ... | $T_{VM}$ |

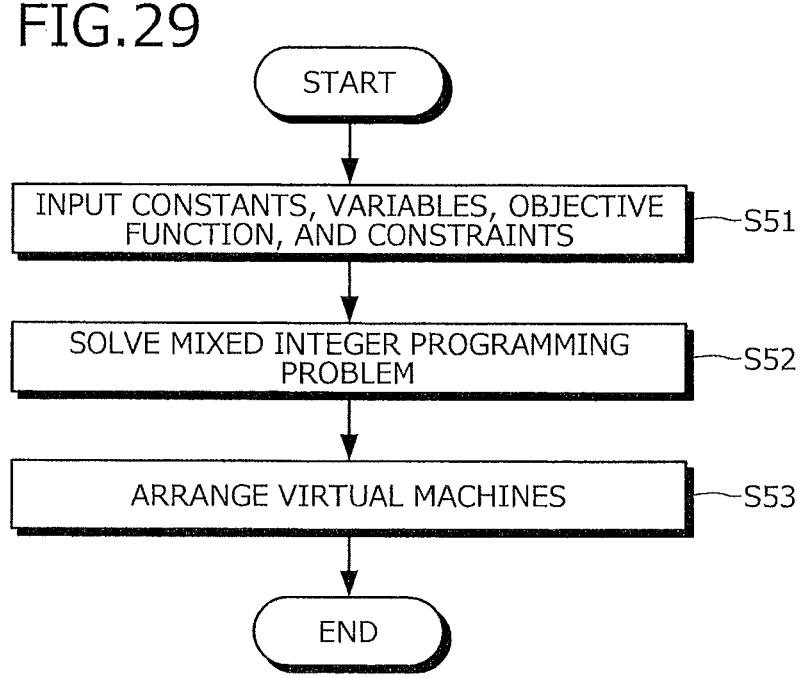
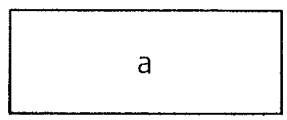

FIG.33

| NUMBER | 1 | ... | S |
|---|---|---|---|
| 1 | $b_{11}$ | ... | $b_{1S}$ |
| ⋮ | ⋮ | ⋮ | ⋮ |
| N | $b_{N1}$ | ... | $b_{NS}$ |

FIG.34

UNIT OF TIME: MIN

| | 0≤t<1 | 1≤t<2 | 2≤t<3 | 3≤t<4 | 4≤t<5 | 5≤t |
|---|---|---|---|---|---|---|
| $b_{ij}$ | 10 | 8 | 6 | 4 | 2 | 0 |

FIG.39

| SERVICE NUMBER | VM NUMBER | RACK NUMBER | SERVER NUMBER | |
|---|---|---|---|---|
| 1 | 1 | 1 | 1 | $x^0_{1,1,1,1}$ |
| | | | : | |
| | | | S | |
| | | : | | |
| | | N | 1 | |
| | | | : | |
| | | | S | |
| | : | | | |
| | M | 1 | 1 | |
| | | | : | |
| | | | S | |
| | | : | | |
| | | N | 1 | |
| | | | : | |
| | | | S | |
| : | | | | |
| V | 1 | 1 | 1 | |
| | | | : | |
| | | | S | |
| | | : | | |
| | | N | 1 | |
| | | | : | |
| | | | S | |
| | : | | | |
| | M | 1 | 1 | |
| | | | : | |
| | | | S | |
| | | : | | |
| | | N | 1 | |
| | | | : | |
| | | | S | $x^0_{V,M,N,S}$ |

COMPUTER SYSTEM AND VIRTUAL MACHINE ARRANGING METHOD

CROSS REFERENCE TO RELATED APPLICATIONS

This is a continuation application of International Application PCT/JP2012/073544 filed on Sep. 13, 2012 which claims priority from International Applications PCT/JP2011/071737 filed on Sep. 22, 2011 and PCT/JP2011/073973 filed on Oct. 18, 2011, the contents of which are incorporated herein by reference.

FIELD

The embodiments discussed herein are related to a computer system and a virtual machine arranging method.

BACKGROUND

According to a conventional method, the lowest value of energy consumption is calculated using the mixed integer programming for each case in which the models and the number of computers concurrently operated differs; the case having the lowest energy consumption is ultimately selected among the cases; and thereby, plural energy supply units are operated to distribute the load thereto (see, e.g., Japanese Laid-Open Patent Publication No. H6-141468). According to another method, a production request is accepted that includes the number of processors, the memory amount, and an assignment policy for resources, of a virtual server that is to be produced; and processors and memories are assigned to the virtual server based on the accepted production request such that the assignment policy is satisfied (see, e.g., Japanese Laid-Open Patent Publication No. 2009-151745). According to yet another method, power consumption is calculated for each software process based on the amount of resources used when a processor executes the software process; some of the software processes are moved from a first processor to a second processor according to the calculated power consumption (see, e.g., Japanese Laid-Open Patent Publication No. 2010-205200). According to another method, the amount of resources to be assigned to a logical server is calculated for each combination of a logical server and physical server resources to minimize the power consumption of plural servers and that of plural air-conditioners; and the assignment of the resources of the physical server to the logical server is changed (see, e.g., Japanese Laid-Open Patent Publication No. 2011-39889). According to still another method, workloads are assigned to information processing apparatuses using the positions of and operation information concerning the information processing apparatuses, and positions of and environment information concerning power supply facility and cooling facility such that the total power consumption of the information processing apparatuses, the power supply loss of the power supply facility, and electric power for cooling used by the cooling facility is reduced (see, e.g., Japanese Laid-Open Patent Publication No. 2009-252056).

However, in a computer system that includes plural racks respectively having an uninterruptible power supply (UPS) and plural servers, according to the conventional methods, a problem arises in that plural virtual machines cannot be assigned to the plural servers. Even when plural virtual machines are assigned to the plural servers according to one of the conventional methods, another problem arises in that in some cases no electric power saving can be facilitated.

SUMMARY

According to an aspect of an embodiment, a computer system includes plural servers in which virtual machines are arranged; plural power supply apparatuses that supply electric power to the servers; and a control apparatus that controls arrangement of the virtual machines in the servers. The control apparatus solves an integer programming problem whose objective function is total power consumption by the servers and by the power supply apparatuses, the total power consumption being described as a function of the arrangement of the virtual machines; and arranges the virtual machines based on a solution of the integer programming problem.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram of data that defines the structure of a data center in the computer system according to the second embodiment;

FIG. 5 is a diagram of data that defines the number of virtual machines in the computer system according to the second embodiment;

FIG. 6 is a diagram of data that defines a scaling factor in the computer system according to the second embodiment;

FIG. 7 is a diagram of data that defines the greatest number of virtual machines executable in the computer system according to the second embodiment;

FIG. 8 is a diagram of data that defines the power consumption of the virtual machines in the computer system according to the second embodiment;

FIG. 9 is a diagram of data that defines a base power consumption of the computer system according to the second embodiment;

FIG. 10 is a diagram of data that defines the power consumption of migration sources of virtual machines in the computer system according to the second embodiment;

FIG. 11 is a diagram of data that defines the power consumption of migration destinations of the virtual machines in the computer system according to the second embodiment;

FIG. 12 is a diagram of initial arrangement data of the virtual machines in the computer system according to the second embodiment;

FIG. 13 is a diagram of data that defines the base power consumption and a proportionality coefficient of a power supply apparatus in the computer system according to the second embodiment;

FIG. 18 is a diagram of data concerning an initial arrangement of the virtual machines in the computer system according to the third embodiment;

FIG. 19 is a diagram of data that defines the number of air conditioning apparatuses in the computer system according to the third embodiment;

FIG. 20 is a diagram of data that defines the base power consumption and the proportionality coefficient of a CRAC unit in the computer system according to the third embodiment;

FIG. 21 is a diagram of data that defines the proportionality coefficient of a chiller plant in the computer system according to the third embodiment;

FIG. 22 is a diagram of data defining a heat flow relation between racks and an air conditioning apparatus in the computer system according to the third embodiment;

FIG. 23 is a diagram of data that defines the supplied heat flow between the racks and the air conditioning apparatus in the computer system according to the third embodiment;

FIG. 29 is a flowchart of the virtual machine arranging method according to the fifth embodiment;

FIG. 30 is a diagram of data defining a used-rack count penalty coefficient in the computer system according to a sixth embodiment;

FIG. 33 is a diagram of data defining a startup stand-by time period penalty coefficient in the computer system according to a seventh embodiment;

FIG. 34 is an explanatory diagram of an example of a table to determine the value of a startup stand-by time period penalty coefficient $b_{ij}$;

FIG. 39 is a diagram of a list of $\chi^0_{m,n,i,j}$ that represents an initial arrangement of the virtual machine.

DESCRIPTION OF EMBODIMENTS

Embodiments of a computer system and a virtual machine arranging method will be described in detail with reference to the accompanying drawings.

Figure 1:
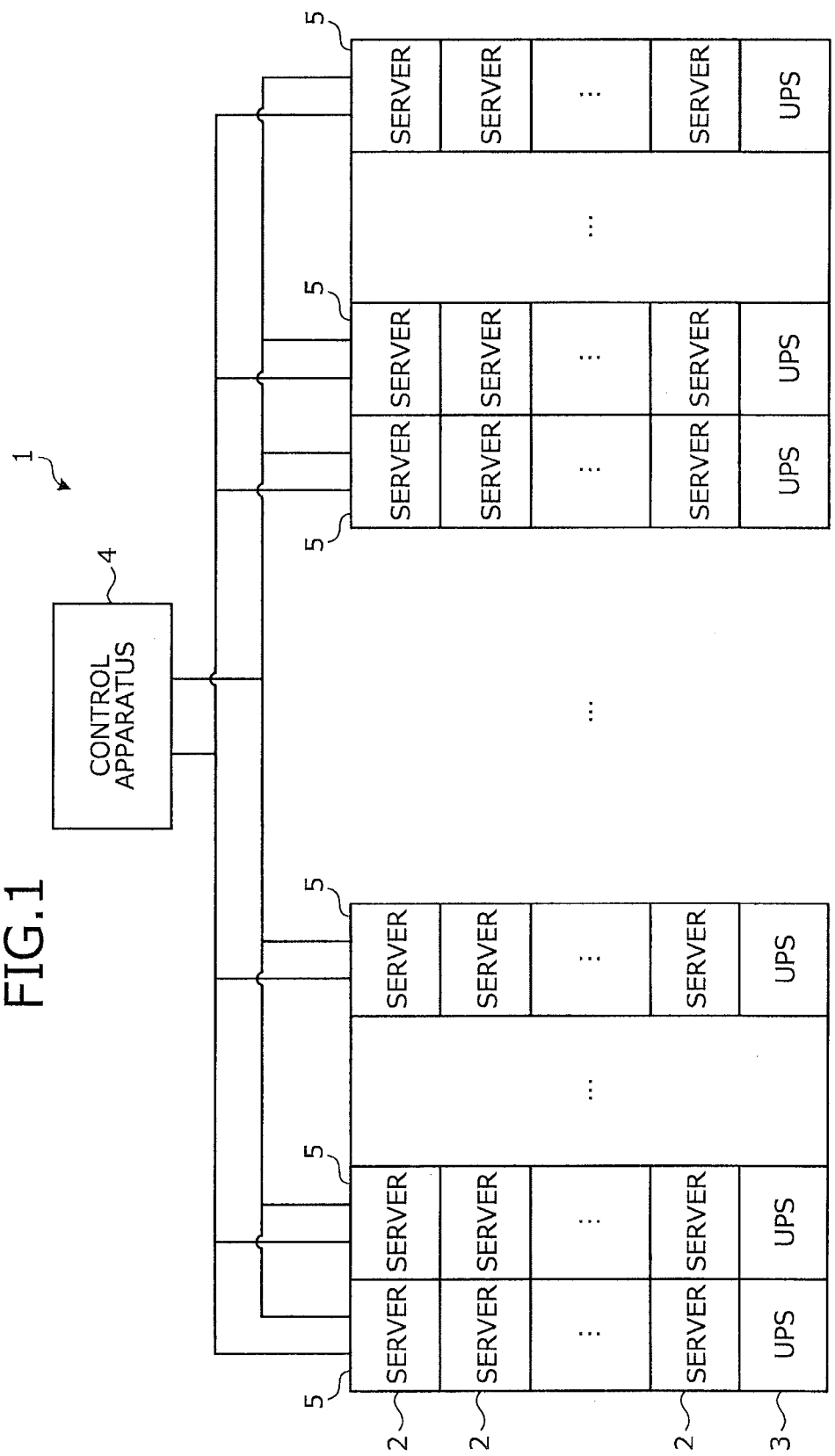
FIG. 1 is a block diagram of a computer system according to a first embodiment.

FIG. 1 is a block diagram of a computer system according to a first embodiment. As depicted in FIG. 1, the computer system 1 includes plural servers 2, plural power supply apparatuses 3, and a control apparatus 4. The servers 2 each have virtual machines arranged therein. The power supply apparatuses 3 supply electric power to the servers 2.

The control apparatus 4 controls the arrangement of the virtual machines for the server 2; solves an integer programming problem using, as an objective function, the total power consumption of the servers 2 and the power supply apparatuses 3, described as a function of the virtual machine arrangement; and arranges the virtual machines in the servers 2 based on the solution of the integer programming problem.

According to the first embodiment, a virtual machine arrangement capable of minimizing the total power consumption can be obtained by solving the integer programming problem that uses, as the objective function, the total power consumption of the power consumption of the servers 2 and the power consumption of the power supply apparatuses 3. Therefore, electric energy saving of the computer system 1 can be facilitated.

In a second embodiment, an example will be described of the computer system 1 according to the first embodiment. An example of the computer system 1 can be, for example, a data center. In the data center, many apparatuses such as computers and those for data communication are operated.

In the computer system 1 depicted in FIG. 1, a data center has plural racks 5 arranged therein. Each of the racks 5 accommodates one or more servers 2 and, as the power supply apparatus 3, for example one UPS. In each of the racks 5, the power supply apparatus 3 supplies electric power to the plural servers 2 accommodated in the same rack. The rack 5 and the control apparatus 4 may be connected to each other by, for example, a communication cable such as that for a local area network (LAN), or radio communication.

Figure 2:
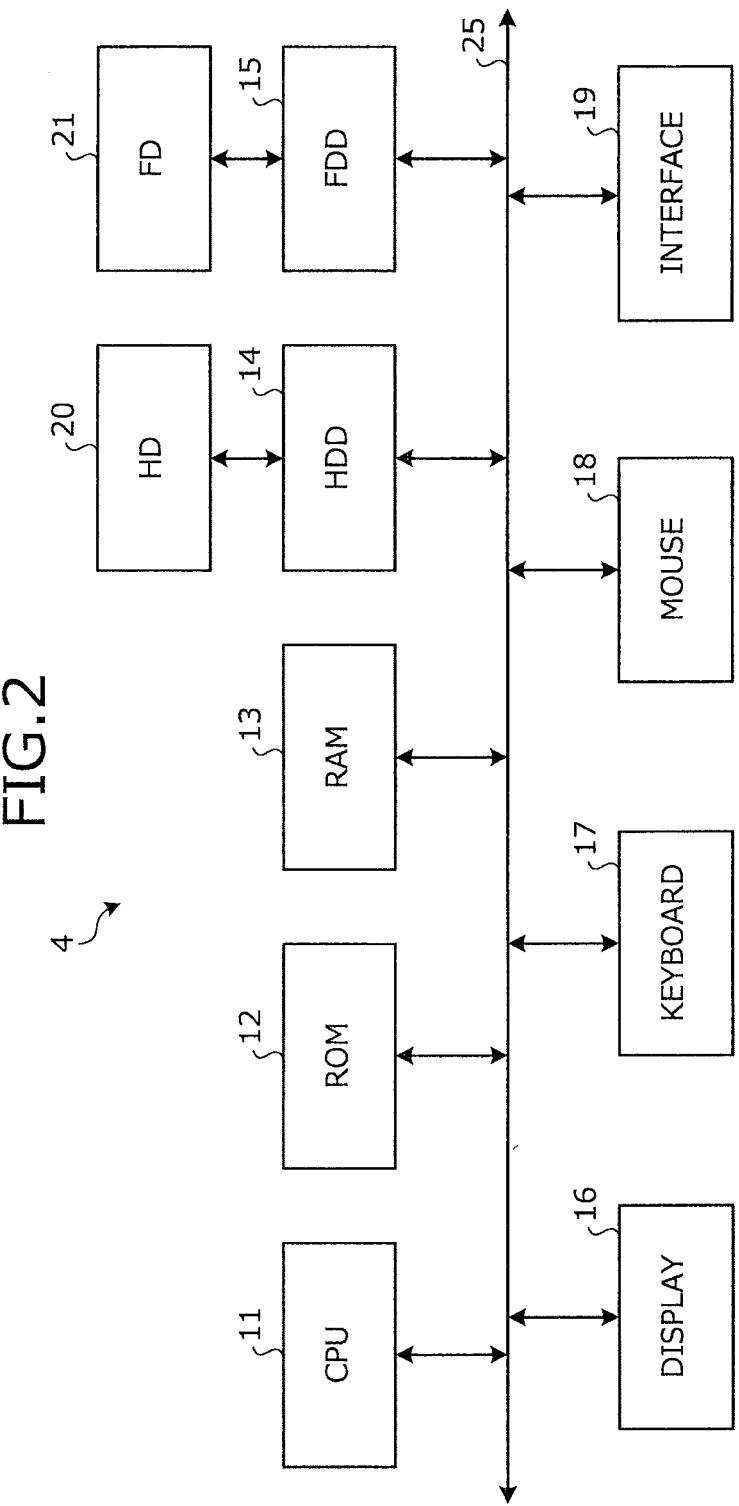
FIG. 2 is a block diagram of a control apparatus of the computer system according to a second embodiment.

FIG. 2 is a block diagram of the control apparatus of the computer system according to a second embodiment. As depicted in FIG. 2, the control apparatus 4 includes a CPU 11, read-only memory (ROM) 12, random access memory (RAM) 13, a hard disk drive (HDD) 14, a hard disk (HD) 20, a flexible disk drive (FDD) 15, a flexible disk (FD) 21 as one example of a removable recording medium, a display 16, a keyboard 17, a mouse 18, and an interface 19, respectively connected by a bus 25.

The CPU 11 administers overall control of the control apparatus 4. The CPU 11 solves the integer programming problem and arranges the virtual machines by executing a program that realizes a virtual machine arranging method described hereinafter. The ROM 12 stores programs such as a boot program and the program that implements the virtual machine arranging method. The RAM 13 is used as a work area of the CPU 11.

The HDD 14 controls the reading and writing of data with respect to the hard disk 20. The hard disk 20 stores data written thereto under the control of the hard disk drive 14. The FDD 15 controls the reading and writing of data with respect to the flexible disk 21. The flexible disk 21 stores data written thereto under the control of the FDD 15.

Besides the flexible disk 21, CD-ROM (CD-R, CD-RW), MO, a digital versatile disk (DVD), or a memory card and the like may be used as a removable recording medium. The display 16 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 16.

The interface 19 is connected to each of the racks 5 via a non-depicted network. The interface 19 controls the input and output of data with respect to the racks 5. A local area network adapter, for example, may be used as the interface 19.

The keyboard 17 includes, for example, keys for inputting letters, numerals, and various instructions and performs the input of data. The keyboard 17 may be a touch-panel-type input pad or numeric keypad, etc. The mouse 18 is used to move the cursor, select a region, or move and change the size of windows. A track ball or a joy stick may be adopted provided each respectively has a function similar to a pointing device.

The control apparatus 4 may be connected to a scanner that takes in images. A printer may be connected to the control apparatus 4, as one example of an output device. The control apparatus 4 may be a computer such as a personal computer and a work station, or an information processing apparatus such as a mobile telephone.

Figure 3:
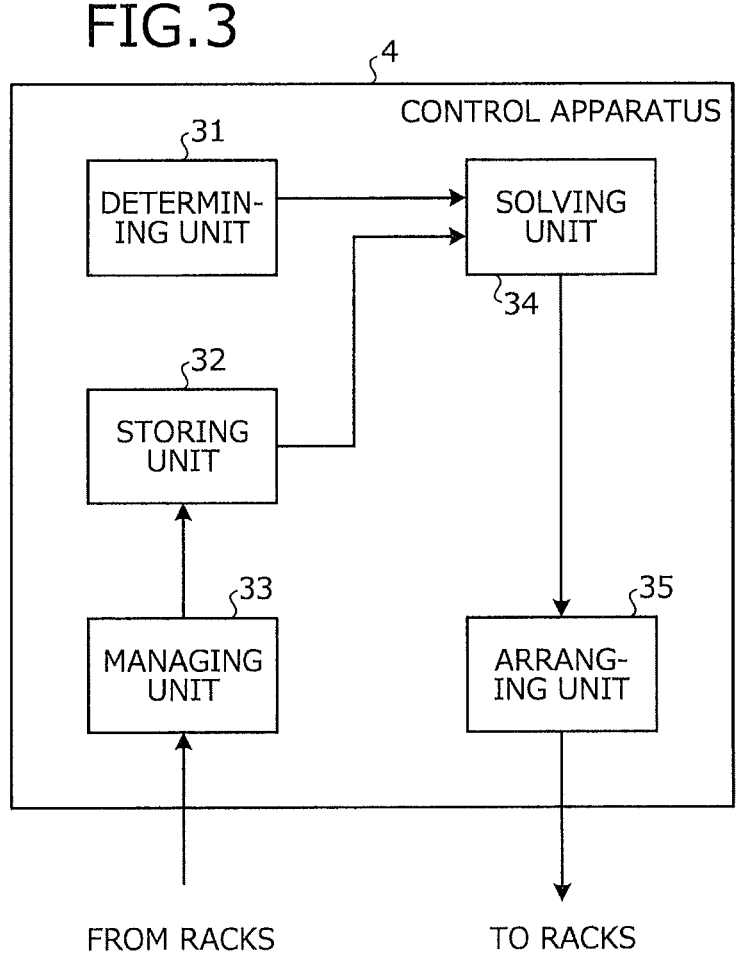
FIG. 3 is a block diagram of a functional configuration of the control apparatus of the computer system according to the second embodiment.

FIG. 3 is a block diagram of a functional configuration of the control apparatus of the computer system according to the second embodiment. As depicted in FIG. 3, the control apparatus 4 includes a determining unit 31, a storing unit 32, a managing unit 33, a solving unit 34, and an arranging unit 35. These components 31 to 35 may be implemented by executing on the CPU 11, the program that realizes the virtual machine arranging method.

The managing unit 33 rewrites data concerning an initial arrangement of the virtual machines, based on information concerning the virtual machines arranged in the servers 2. The data concerning the initial arrangement includes for each of the servers 2, the number of arranged virtual machines and may be stored in, for example, the storing unit 32.

The storing unit 32 stores data (constants), variables, an objective function, and constraints; inputs the data (the constants), the variables, the objective function, and the constraints into the solving unit 34; and may use memory such as, for example, the ROM 12 or the RAM 13 as the storage medium thereof. The data (the constants), the variables, the objective function, and the constraints that do not dynamically vary may be described in the program that realizes the virtual machine arranging method.

The determining unit 31 determines the integer programming problem that is to be solved among integer programming problems that correspond to the initial arrangement of the virtual machines, an additional arrangement thereof, and a rearrangement thereof. The determining unit 31 issues an instruction to the solving unit 34 based on the result of the determination thereof.

Solving the integer programming problem corresponding to the initial arrangement of the virtual machines enables an arrangement of the one or more virtual machine(s) in one or more server(s) 2 in a state where all the servers 2 discontinue operation. The initial arrangement of the virtual machines in this case is the state where no virtual machine is arranged in any of the servers 2.

Solving the integer programming problem corresponding to the additional arrangement of the virtual machines enables an arrangement of further one or more virtual machine(s) to further one or more server(s) 2 in addition to the initial arrangement state where the one or more virtual machine(s) is/are already arranged in the one or more server(s) 2. However, none of the virtual machines arranged in the initial arrangement state is moved to any other server 2.

Solving the integer programming problem corresponding to the rearrangement of the virtual machines enables a rearrangement of the virtual machines using live migration for the initial arrangement state where the one or more virtual machine(s) is/are already arranged in the one or more server(s) 2. Without discontinuing the operation of one or more virtual machine(s) arranged in a server 2, the virtual machine(s) can be arranged in another server 2 by using the live migration. The control apparatus 4 may monitor the operation time period of the data center using a timer, etc. included therein and may execute the rearrangement of the virtual machines each time a specific time period elapses.

The solving unit 34 solves the integer programming problems based on the data (the constants), the variables, the objective function, and the constraints delivered from the storing unit 32 and the instruction from the determining unit 31; may solve an integer programming problem (formulated by, for example, Eqs. (8) to (12) described later) when the initial arrangement of the virtual machines is executed; may solve an integer programming problem (formulated by, for example, Eqs. (14) to (18) described later) when the additional arrangement of the virtual machines is executed; and may solve an integer programming problem (formulated by, for example, Eqs. (36) to (50) described later) when the rearrangement of the virtual machines is executed.

An example of the solving unit 34 can be, for example, software to solve the integer programming problems (a solver). Examples of the solver can be, for example, "GLPK", "SYMPHONY", and "Gurobi Optimizer". The arranging unit 35 arranges the virtual machines in the servers 2 based on the solution of the integer programming problem derived by the solving unit 34.

FIG. 4 is a diagram of data that defines the structure of the data center in the computer system according to the second embodiment. As depicted in FIG. 4, the number of racks set in the data center is "N" and the number of servers per one rack is "S". S and N are positive integers.

FIG. 5 is a diagram of data that defines the number of virtual machines in the computer system according to the second embodiment. As depicted in FIG. 5, the number of virtual machines to be arranged is "M". M is a positive integer.

FIG. 6 is a diagram of data that defines a scaling factor in the computer system according to the second embodiment. The scaling factor is a constant that defines which among reduction of the power consumption after rearrangement and reduction of the power consumption of live migration is more important when the rearrangement of the virtual machines is executed. As depicted in FIG. 6, the scaling factor is "c". "c" is a positive real number.

For example, "c" may be a value obtained by dividing the average operation time period of the live migration by the average operation time period of the virtual machines after the rearrangement. "c" in this case is a value less than one. Selecting c in this manner enables minimization of the total power consumption of the power consumption of the servers 2 and that of the power supply apparatuses 3.

FIG. 7 is a diagram of data that defines the greatest number of virtual machines executable in the computer system according to the second embodiment. As depicted in FIG. 7, the greatest number of virtual machines executable by the j-th server in the i-th rack is "$L_{ij}$". "$L_{ij}$" is a positive integer. "i" is an integer from one to N. "j" is an integer from one to S.

FIG. 8 is a diagram of data that defines the power consumption of the virtual machines in the computer system according to the second embodiment. As depicted in FIG. 8, the electric power consumed per one virtual machine operating in the j-th server in the i-th rack is $\alpha_{ij}$ [W]. "$\alpha_{ij}$" is a positive real number.

FIG. 9 is a diagram of data that defines the base power consumption of the computer system according to the second embodiment. As depicted in FIG. 9, the electric power consumed by turning on of the power of the j-th server in the i-th rack is $\beta_{ij}$ [W]. "$\beta_{ij}$" is a positive real number.

FIG. 10 is a diagram of data that defines the power consumption of the migration sources of the virtual machines in the computer system according to the second embodiment. When a virtual machine is migrated by live migration, the server at the migration source consumes electric power. As depicted in FIG. 10, the electric power consumed when one virtual machine is moved from the j-th server in the i-th rack to another server is $\gamma^-_{ij}$ [W]. "$\gamma^-_{ij}$" is a positive real number.

FIG. 11 is a diagram of data that defines the power consumption of the migration destinations of the virtual machines in the computer system according to the second embodiment. When the virtual machine is migrated by the live migration, the server at the migration destination consumes electric power. As depicted in FIG. 11, the electric power consumed when one virtual machine is moved to the j-th server in the i-th rack from another server is $\gamma^+_{ij}$ [W]. "$\gamma^+_{ij}$" is a positive real number.

FIG. 12 is a diagram of initial arrangement data of the virtual machines in the computer system according to the second embodiment. As depicted in FIG. 12, the number of virtual machines already arranged in the j-th server in the i-th rack is $w_{ij}[0]$. "$w_{ij}[0]$" is an integer greater than or equal to zero and less than or equal to $L_{ij}$.

FIG. 13 is a diagram of data that defines the base power consumption and the proportionality coefficient of the power supply apparatus in the computer system according to the second embodiment. As depicted in FIG. 13, the base power consumption, which is the power continually consumed by the power supply apparatus in the i-th rack, is $\eta_i$ [W]. "$\eta_i$" is a positive real number. The proportionality coefficient is $\epsilon_i$ and represents how many times more the electric power consumed by the power supply apparatus 3 is compared to the total electric power consumption of the servers in the i-th rack. "$\epsilon_i$" is a positive real number. According to a catalog of ordinary power supply apparatuses, $\epsilon_i$ is about 0.01 to 0.04 as an example.

The values of N and S are determined in advance based on the configuration of the data center. The values of c, $L_{ij}$, $\alpha_{ij}$, $\beta_{ij}$, $\gamma^-_{ij}$, and $\gamma^+_{ij}$ are determined in advance based on the server. The values of $\eta_i$ and $\epsilon_i$ are determined in advance based on the power supply apparatus. "$w_{ij}[0]$" is dynamically rewritten by the managing unit 33 during the operation of the data center. M is determined according to the number of applications to be started up, etc.

Figure 14:
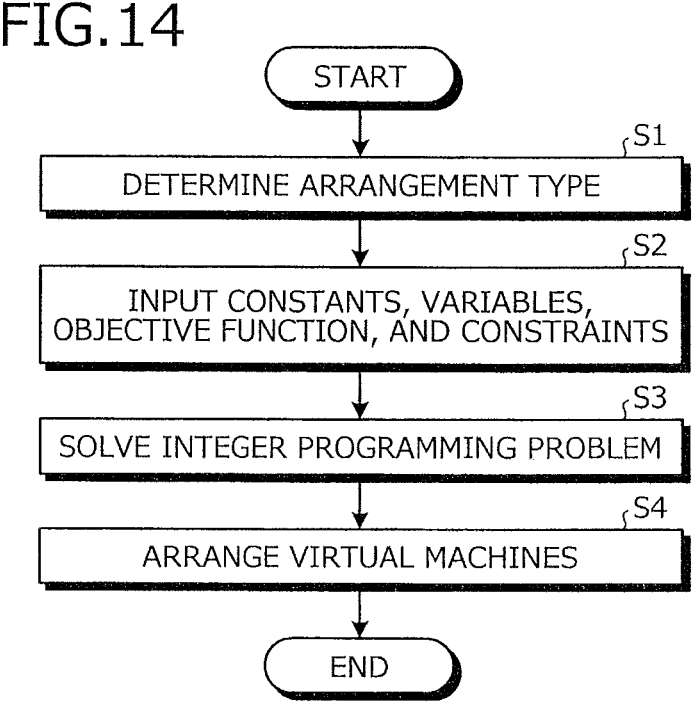
FIG. 14 is a flowchart of a virtual machine arranging method according to the second embodiment.

FIG. 14 is a flowchart of the virtual machine arranging method according to the second embodiment. As depicted in FIG. 14, when the arrangement of the virtual machines is started, the determining unit 31 of the control apparatus 4 determines which one among initial arrangement, additional arrangement, and rearrangement, the type of the arrangement of the virtual machines is (step S1). The determining unit 31 instructs the solving unit 34 about the type of the arrangement based on the result of the determination.

The storing unit 32 inputs the data (the constants), the variables, the objective function, and the constraints into the solving unit 34 (step S2). The solving unit 34 solves the integer programming problem using, for example, the solver based on the data (the constants), the variables, the objective function, and the constraints that are input thereinto, and the instruction from the determining unit 31 to obtain a solution (step S3). The formulation as the integer programming problem will be described later for each type of arrangement. The arranging unit 35 arranges the virtual machines based on the solution obtained by the solving unit 34 (step S4). The series of process steps of the virtual machine arrangement process come to an end.

Modeling will be described for the power consumption of the server, the power consumption of the power supply apparatus, the total power consumption of the servers and the power supply apparatus in the rack, and the total power consumption of the servers and the power supply apparatuses in the data center.

The server has the properties of (S-1) to (S-3) below concerning the power consumption thereof.

(S-1) When at least one virtual machine is executed, the power of the server is turned on. When the number of execution sessions of the virtual machine is zero, the power of the server is turned off.
(S-2) When the power is turned on, a specific amount of electric power is consumed.
(S-3) When the number of executed virtual machines is increased, the power consumption is increased according to the increase.

A variable representing the number of virtual machines executed by the j-th server in the i-th rack is represented by "$w_{ij}$". "$w_{ij}$" is an integer variable greater than or equal to zero and less than or equal to $L_{ij}$. "$v_{ij}$" is a variable that takes the value of one or zero for the j-th server in the i-th rack. A constraint below is imposed on $v_{ij}$.

$$v_{ij} \leq w_{ij} \leq L_{ij} v_{ij} \tag{1}$$

In Eq. (1), in a case where $w_{ij}$ is greater than or equal to one, when $v_{ij}$ is zero, the inequality on the right side of Eq. (1) does not hold and therefore, $v_{ij}$ is one. On the other hand, in a case where $w_{ij}$ is zero, when $v_{ij}$ is one, the inequality on the left side of Eq. (1) does not hold and therefore, $v_{ij}$ is zero.

Therefore, the value of $v_{ij}$ indicates the turning on or off of the power of the server. When the value of $v_{ij}$ is zero, this indicates that the power of the server is turned off and, when the value of $v_{ij}$ is one, this indicates that the power thereof is turned on. Eqs. (2) and (3) express the above.

$$w_{ij} \geq 1 \Leftrightarrow \text{server power ON} \Leftrightarrow v_{ij}=1 \tag{2}$$

$$w_{ij}=0 \Leftrightarrow \text{server power OFF} \Leftrightarrow v_{ij}=0 \tag{3}$$

The power consumption of the j-th server in the i-th rack is expressed by Eq. (4) below using the constants and variables. Eq. (4) expresses the properties of (S-1) to (S-3) using linear expressions of the variables $w_{ij}$ and $v_{ij}$.

$$\beta_{ij} v_{ij} + \alpha_{ij} w_{ij} \tag{4}$$

In Eq. (4): "$\alpha_{ij} w_{ij}$" corresponds to [the electric power consumed per one virtual machine×the number of virtual machines] and therefore, represents the electric power consumed corresponding to the number of virtual machines; and "$\beta_{ij} v_{ij}$" becomes $\beta_{ij}$ when the power of the server is turned on, becomes zero when the power of the server is turned off and therefore, represents the electric power consumed by the turning on of the power of the server.

The power supply apparatus has properties of (U-1) and (U-2) below concerning the power consumption thereof.
(U-1) A specific amount of electric power is continually consumed regardless of the operation state of the servers in the rack.
(U-2) When the total power consumption of the servers in the rack is increased, the power consumption is increased according to the increase.

The power consumption of the power supply apparatus equipped to the i-th rack is expressed by Eq. (5) below based on the properties of (U-1) and (U-2). Eq. (5) expresses the properties of (U-1) and (U-2) using a linear expression of the variables $w_{ij}$ and $v_{ij}$.

$$\eta_i + \varepsilon_i \sum_{j=1}^{S} (\beta_{ij} v_{ij} + \alpha_{ij} w_{ij}) \quad (5)$$

In Eq. (5), $[\Sigma(\beta_{ij}v_{ij}+\alpha_{ij}w_{ij})]$ ($\Sigma$ index "j" is omitted) represents the total power consumption of the servers in the i-th rack. The second term of Eq. (5) obtained by multiplying the total power consumption of the servers in the i-th rack by $\varepsilon_i$ represents the electric power consumed by the power supply apparatus corresponding to the total power consumption of the servers in the i-th rack. "$\eta_i$" represents the electric power continually consumed by the power supply apparatus of the i-th rack.

As described in the section for the modeling of the power consumption of the power supply apparatus, the total power consumption of the servers in the i-th rack is $[\Sigma(\beta_{ij}v_{ij}+\alpha_{ij}w_{ij})]$ ($\Sigma$ index "j" is omitted). The power consumption of the power supply apparatus equipped in the i-th rack is expressed by Eq. (5). The power consumption obtained by adding these is the total power consumption of the i-th rack. Therefore, the total power consumption of the i-th rack is expressed by Eq. (6) below.

$$\eta_i + (1+\varepsilon_i) \sum_{j=1}^{S} (\beta_{ij} v_{ij} + \alpha_{ij} w_{ij}) \quad (6)$$

The number of servers in the rack may be variable. The number of servers in the rack being variable can be represented by a constraint of $[w_{ij}=0, j\geq s]$, for solving the integer programming problem representing the number of servers in the i-th rack as "s", which is an integer smaller than integer S.

The sum of Eq. (6) for the first to the N-th racks gives the total power consumption in the data center. Therefore, the total power consumption in the data center is expressed by Eq. (7) below.

$$\sum_{i=1}^{N} \left( \eta_i + (1+\varepsilon_i) \sum_{j=1}^{S} (\beta_{ij} v_{ij} + \alpha_{ij} w_{ij}) \right) \quad (7)$$

Formulation as an integer programming problem will be described for the initial arrangement, the additional arrangement, and the rearrangement of the virtual machines.

When the initial arrangement of the virtual machines is executed, no server has any virtual machine arranged therein. Therefore, the power of all the servers is turned off.

The electric power saving problem of the servers and the power supply apparatuses arising when the initial arrangement of the virtual machines is executed can be formulated as an integer programming problem expressed by Eqs. (8) to (12) below. Eq. (8) expresses the objective function. Eqs. (9) to (12) express the constraints. Eq. (11) expresses the constraints for the total number of the virtual machines to be arranged to be equal to the number of virtual machines that needs to be arranged. The decision variables are $w_{ij}$, $v_{ij}$, i=1, . . . , and N, and j=1, . . . , and S.
Minimize $$\sum_{i=1}^{N} \left( \eta_i + (1+\varepsilon_i) \sum_{j=1}^{S} (\beta_{ij} v_{ij} + \alpha_{ij} w_{ij}) \right) \quad (8)$$

$$w_{ij} \in \{0, 1, \ldots, L_{ij}\}, i=1, \ldots, N, j=1, \ldots, S \quad (9)$$

$$v_{ij} \in \{0, 1\}, i=1, \ldots, N, j=1, \ldots, S \quad (10)$$

$$\sum_{i=1}^{N} \sum_{j=1}^{S} w_{ij} = M \quad (11)$$

$$v_{ij} \leq w_{ij} \leq L_{ij} v_{ij}, i=1, \ldots, N, j=1, \ldots, S \quad (12)$$

It is assumed as the precondition for executing the additional arrangement of the virtual machines that $w_{ij}[0]$ virtual machines are already arranged in the j-th server in the i-th rack. It is also assumed that the currently arranged virtual machines are not migrated. Therefore, virtual machines are additionally arranged in the servers already having $w_{ij}[0]$ virtual machines arranged therein as the initial state and therefore, $w_{ij}$ is a value greater than or equal to $w_{ij}[0]$. Expressing this as a constraint gives Eq. (13) below.

$$w_{ij} \in \{w_{ij}[0], \ldots, L_{ij}\}, i=1, \ldots, N, j=1, \ldots, S \quad (13)$$

The number of additionally arranged virtual machines is represented by "$\Delta M$". The number of virtual machines arranged in the initial arrangement state is $[\Sigma\Sigma w_{ij}[0]]$ (former $\Sigma$ index "i" and latter $\Sigma$ index "j" are omitted) and therefore, the number of virtual machines after the additional arrangement is $[\Sigma\Sigma w_{ij}[0]+\Delta M]$ (former $\Sigma$ index "i" and latter $\Sigma$ index "j" are omitted).

Therefore, the electric power saving problem of the servers and the power supply apparatus arising when the additional arrangement of the virtual machines is executed can be formulated as an integer programming problem expressed by Eqs. (14) to (18) below. Eq. (14) expresses the objective function. Eqs. (15) to (18) express the constraints. Eq. (17) expresses the constraints for the total number of the virtual machines after the additional arrangement to be equal to the value obtained by adding the number of virtual machines in the initial arrangement state and the number of additionally arranged virtual machines. The decision variables are $w_{ij}$, $v_{ij}$, i=1, . . . , and N, and j=1, . . . , and S.
Minimize $$\sum_{i=1}^{N} \left( \eta_i + (1+\varepsilon_i) \sum_{j=1}^{S} (\beta_{ij} v_{ij} + \alpha_{ij} w_{ij}) \right) \quad (14)$$

$$w_{ij} \in \{w_{ij}[0], \ldots, L_{ij}\}, i=1, \ldots, N, j=1, \ldots, S \quad (15)$$

$$v_{ij} \in \{0, 1\}, i=1, \ldots, N, j=1, \ldots, S \quad (16)$$

-continued $$\sum_{i=1}^{N}\sum_{j=1}^{S} w_{ij} = M := \sum_{i=1}^{N}\sum_{j=1}^{S} w_{ij}[0] + \Delta M \quad (17)$$

$$v_{ij} \le w_{ij} \le L_{ij}v_{ij}, i=1,\ldots,N, j=1,\ldots,S \quad (18)$$

It is assumed as the precondition for executing the rearrangement of the virtual machines that $w_{ij}[0]$ virtual machines are already arranged in the j-th server in the i-th rack. In a rearrangement of the virtual machines, the virtual machines are migrated using the live migration. When a virtual machine is migrated using the live migration, both the migration source server and the migration destination server consume electric power.

"$\delta^-_{ij}$" is a variable taking a value of zero or one for the j-th server in the i-th rack. A constraint below is imposed on $\delta^-_{ij}$. Here, "d" is a positive real number smaller than one.

$$d+(-L_{ij}-d)\delta^-_{ij} \le w_{ij}-w_{ij}[0] \le L_{ij}(1-\delta^-_{ij}) \quad (19)$$

In Eq. (19), in a case where $[w_{ij}-w_{ij}[0]]$ is less than or equal to zero, when $\delta^-_{ij}$ is zero, the inequality on the left side of Eq. (19) does not hold and therefore, $\delta^-_{ij}$ is one. On the other hand, in a case where $[w_{ij}-w_{ij}[0]]$ is greater than or equal to one, when $\delta^-_{ij}$ is one, the inequality on the right side of Eq. (19) does not hold and therefore, $\delta^-_{ij}$ is zero. Eqs. (20) and (21) express the above.

$$w_{ij}-w_{ij}[0] \le 0 \Leftrightarrow \delta^-_{ij}=1 \quad (20)$$

$$w_{ij}-w_{ij}[0] \ge 1 \Leftrightarrow \delta^-_{ij}=0 \quad (21)$$

"$z^-_{ij}$" is an integer variable taking a value that is any one of zero to L for the j-th server in the i-th rack. Constraints below are imposed on $z^-_{ij}$.

$$-L_{ij}\delta^-_{ij} \le z^-_{ij} \le L_{ij}\delta^-_{ij} \quad (22)$$

$$-(w_{ij}-w_{ij}[0])-L_{ij}(1-\delta^-_{ij}) \le z^-_{ij} \le -(w_{ij}-w_{ij}[0])+L_{ij}(1-\delta^-_{ij}) \quad (23)$$

When $[w_{ij}-w_{ij}[0]]$ is greater than or equal to one, $\delta^-_{ij}$ is zero based on Eq. (21). Therefore, $z^-_{ij}$ is zero. When $w_{ij}-w_{ij}[0]$, $\delta^-_{ij}$, and $z^-_{ij}$ are $[w_{ij}-w_{ij}[0] \ge 1, \delta^-_{ij}=0,$ and $z^-_{ij}=0]$, $[-(w_{ij}-w_{ij}[0])+L_{ij} \ge 0 \ge -(w_{ij}-w_{ij}[0])-L_{ij}]$ in Eq. (23). Therefore, Eq. (23) holds. Eq. (24) below expresses this.

$$w_{ij}-w_{ij}[0] \ge 1 \Rightarrow z^-_{ij}=0 \quad (24)$$

On the other hand, when $[w_{ij}-w_{ij}[0]]$ is less than or equal to zero, $\delta^-_{ij}$ is one based on Eq. (20). Therefore, Eq. (23) is $[-(w_{ij}-w_{ij}[0]) \le z^-_{ij} \le -(w_{ij}-w_{ij}[0])]$. Therefore, $z^-_{ij}$ is equal to $[-(w_{ij}-w_{ij}[0])]$.

When $w_{ij}-w_{ij}[0]$, $\delta^-_{ij}$, and $z^-_{ij}$ are $[w_{ij}-w_{ij}[0] \le 0, \delta^-_{ij}=1,$ and $z^-_{ij}=-(w_{ij}-w_{ij}[0])]$, $[-L_{ij} \le -(w_{ij}-w_{ij}[0]) \le L_{ij}]$ in Eq. (22). Therefore, Eq. (22) holds. Eq. (25) below expresses this.

$$w_{ij}-w_{ij}[0] \le 0 \Rightarrow z^-_{ij}=-(w_{ij}-w_{ij}[0]) \quad (25)$$

$[w_{ij}-w_{ij}[0]]$ being less than or equal to zero means that the virtual machines are migrated from the j-th server in the i-th rack to another server. $[w_{ij}-w_{ij}[0]]$ being greater than or equal to one means that the virtual machines are migrated to the j-th server in the i-th rack from another server. "$z^-_{ij}$" represents the number of virtual machines that migrate from the j-th server in the i-th rack to another server.

Therefore, the electric power consumed when the $z^-_{ij}$ virtual machines are migrated from the j-th server in the i-th rack to the other server is expressed by Eq. (26) below.

$$\gamma^-_{ij} z^-_{ij} \quad (26)$$

"$\delta^+_{ij}$" is a variable taking a value of zero or one for the j-th server in the i-th rack. A constraint below is imposed on $\delta^+_{ij}$.

$$\delta^+_{ij}=1-\delta^-_{ij} \quad (27)$$

Eqs. (28) and (29) are obtained from Eqs. (20) and (21) that are the constraints of Eq. (27).

$$w_{ij}-w_{ij}[0] \le 0 \Leftrightarrow \delta^+_{ij}=0 \quad (28)$$

$$w_{ij}-w_{ij}[0] \ge 1 \Leftrightarrow \delta^+_{ij}=1 \quad (29)$$

"$z^+_{ij}$" is an integer variable taking a value that is any one of zero to $L_{ij}$ for the j-th server in the i-th rack. Constraints below are imposed on $z^+_{ij}$.

$$-L_{ij}\delta^+_{ij} \le z^+_{ij} \le L_{ij}\delta^+_{ij} \quad (30)$$

$$(w_{ij}-w_{ij}[0])-L_{ij}(1-\delta^+_{ij}) \le z^+_{ij} \le (w_{ij}-w_{ij}[0])+L_{ij}(1-\delta^+_{ij}) \quad (31)$$

When $[w_{ij}-w_{ij}[0]]$ is greater than or equal to one, $\delta^+_{ij}$ is one from Eq. (29). Therefore, Eq. (31) is $[w_{ij}-w_{ij}[0] \le z^+_{ij} \le w_{ij}-w_{ij}[0]]$ and therefore, $z^+_{ij}$ is equal to $[w_{ij}-w_{ij}[0]]$.

When $[w_{ij}-w_{ij}[0]]$, $\delta^+_{ij}$, and $z^+_{ij}$ are $[w_{ij}-w_{ij}[0] \ge 1, \delta^+_{ij}=1,$ and $z^+_{ij}=w_{ij}-w_{ij}[0]]$, $[-L_{ij} \le w_{ij}-w_{ij}[0] \le L_{ij}]$ is obtained in Eq. (30). Therefore, Eq. (30) holds. Eq. (32) expresses this.

$$w_{ij}-w_{ij}[0] \ge 1 \Rightarrow z^+_{ij}=w_{ij}-w_{ij}[0] \quad (32)$$

On the other hand, when $[w_{ij}-w_{ij}[0]]$ is less than or equal to zero, $\delta^+_{ij}$ is zero from Eq. (28). Therefore, Eq. (30) is $[0 \le z^+_{ij} \le 0]$ and therefore, $z^+_{ij}$ is zero. When $[w_{ij}-w_{ij}[0]]$, $\delta^+_{ij}$, and $z^+_{ij}$ are $[w_{ij}-w_{ij}[0] \le 0, \delta^+_{ij}=0,$ and $z^+_{ij}=0]$, $[(w_{ij}-w_{ij}[0])-L_{ij} \le 0 \le (w_{ij}-w_{ij}[0])+L_{ij}]$ is obtained in Eq. (31). Therefore, Eq. (31) holds. Eq. (33) expresses this.

$$w_{ij}-w_{ij}[0] \le 0 \Rightarrow z^+_{ij}=0 \quad (33)$$

"$z^+_{ij}$" represents the number of virtual machines that are migrated to the j-th server in the i-th rack from another server. Therefore, the power consumption consumed when $z^+_{ij}$ virtual machines are migrated to the j-th server in the i-th rack from another server is expressed by Eq. (34) below.

$$\gamma^+_{ij} z^+_{ij} \quad (34)$$

The electric power consumed by the live migration is obtained by totaling, for the j-th server in the i-th rack, the power consumption consumed when the $z^-_{ij}$ virtual machines are migrated therefrom to another server and the power consumption consumed when the $z^+_{ij}$ virtual machines migrate thereto from another server, and further totaling this total for all the servers. Therefore, the electric power consumed by the live migration is expressed by Eq. (35) below.

$$\sum_{i=1}^{N}\sum_{j=1}^{S} \gamma^-_{ij} z^-_{ij} + \sum_{i=1}^{N}\sum_{j=1}^{S} \gamma^+_{ij} z^+_{ij} \quad (35)$$

Therefore, the electric power saving problem of the servers and the power supply apparatuses arising when the rearrangement of the virtual machines is executed can be formulated as an integer programming problem expressed by Eqs. (36) to (50) below. Eq. (36) expresses the objective function. Eqs. (37) to (50) express the constraints. The decision variables are $w_{ij}, v_{ij}, \delta^-_{ij}, \delta^+_{ij}, z^-_{ij}, z^+_{ij}, i=1,\ldots,$ and N, and $j=1,\ldots,$ and S.

Minimize $$\sum_{i=1}^{N}\left(\eta_i + (1+\varepsilon_i)\sum_{j=1}^{S}(\beta_{ij}v_{ij} + \alpha_{ij}w_{ij})\right) + \quad (36)$$

$$c\left(\sum_{i=1}^{N}\sum_{j=1}^{S}\gamma_{ij}^{-}z_{ij}^{-} + \sum_{i=1}^{N}\sum_{j=1}^{S}\gamma_{ij}^{+}z_{ij}^{+}\right)$$

$$w_{ij} \in \{0, 1, \ldots, L_{ij}\}, i = 1, \ldots, N, j = 1, \ldots, S \quad (37)$$

$$v_{ij} \in \{0, 1\}, i = 1, \ldots, N, j = 1, \ldots, S \quad (38)$$

$$\sum_{i=1}^{N}\sum_{j=1}^{S} w_{ij} = M := \sum_{i=1}^{N}\sum_{j=1}^{S} w_{ij}[0] \quad (39)$$

$$v_{ij} \leq w_{ij} \leq L_{ij}v_{ij}, i = 1, \ldots, N, j = 1, \ldots, S \quad (40)$$

$$\delta_{ij}^{-} \in \{0, 1\}, i = 1, \ldots, N, j = 1, \ldots, S \quad (41)$$

$$d + (-L_{ij} - d)\delta_{ij}^{-} \leq w_{ij} - w_{ij}[0] \leq L_{ij}(1 - \delta_{ij}^{-}), \quad (42)$$
$$i = 1, \ldots, N, j = 1, \ldots, S$$

$$z_{ij}^{-} \in \{0, 1, \ldots, L_{ij}\}, i = 1, \ldots, N, j = 1, \ldots, S \quad (43)$$

$$-L_{ij}\delta_{ij}^{-} \leq z_{ij}^{-} \leq L_{ij}\delta_{ij}^{-}, i = 1, \ldots, N, j = 1, \ldots, S \quad (44)$$

$$-(w_{ij} - w_{ij}[0]) - L_{ij}(1 - \delta_{ij}^{-}) \leq \quad (45)$$
$$z_{ij}^{-} \leq -(w_{ij} - w_{ij}[0]) + L_{ij}(1 - \delta_{ij}^{-}),$$
$$i = 1, \ldots, N, j = 1, \ldots, S$$

$$\delta_{ij}^{+} \in \{0, 1\}, i = 1, \ldots, N, j = 1, \ldots, S \quad (46)$$

$$\delta_{ij}^{+} = 1 - \delta_{ij}^{1}, i = 1, \ldots, N, j = 1, \ldots, S \quad (47)$$

$$z_{ij}^{+} \in \{0, 1, \ldots, L_{ij}\}, i = 1, \ldots, N, j = 1, \ldots, S \quad (48)$$

$$-L_{ij}\delta_{ij}^{+} \leq z_{ij}^{+} \leq L_{ij}\delta_{ij}^{+}, i = 1, \ldots, N, j = 1, \ldots, S \quad (49)$$

$$(w_{ij} - w_{ij}[0]) - L_{ij}(1 - \delta_{ij}^{+}) \leq \quad (50)$$
$$z_{ij}^{+} \leq -(w_{ij} - w_{ij}[0]) + L_{ij}(1 - \delta_{ij}^{+}),$$
$$i = 1, \ldots, N, j = 1, \ldots, S$$

According to the second embodiment, the same effect as that of the first embodiment is achieved for the initial arrangement, the additional arrangement, and the rearrangement of the virtual machines, respectively.

In a third embodiment, a case will be described as an example of the computer system 1 according to the first embodiment, where, for example, an air conditioning apparatus is installed in the data center of the second embodiment and the electric power saving is facilitated for the overall data center including the power consumption of the air conditioning apparatus. In the third embodiment, the size of the virtual machines may differ from one another. Components identical to those in the second embodiment are given the same reference numerals used in the second embodiment and will not again be described.

Figure 15:
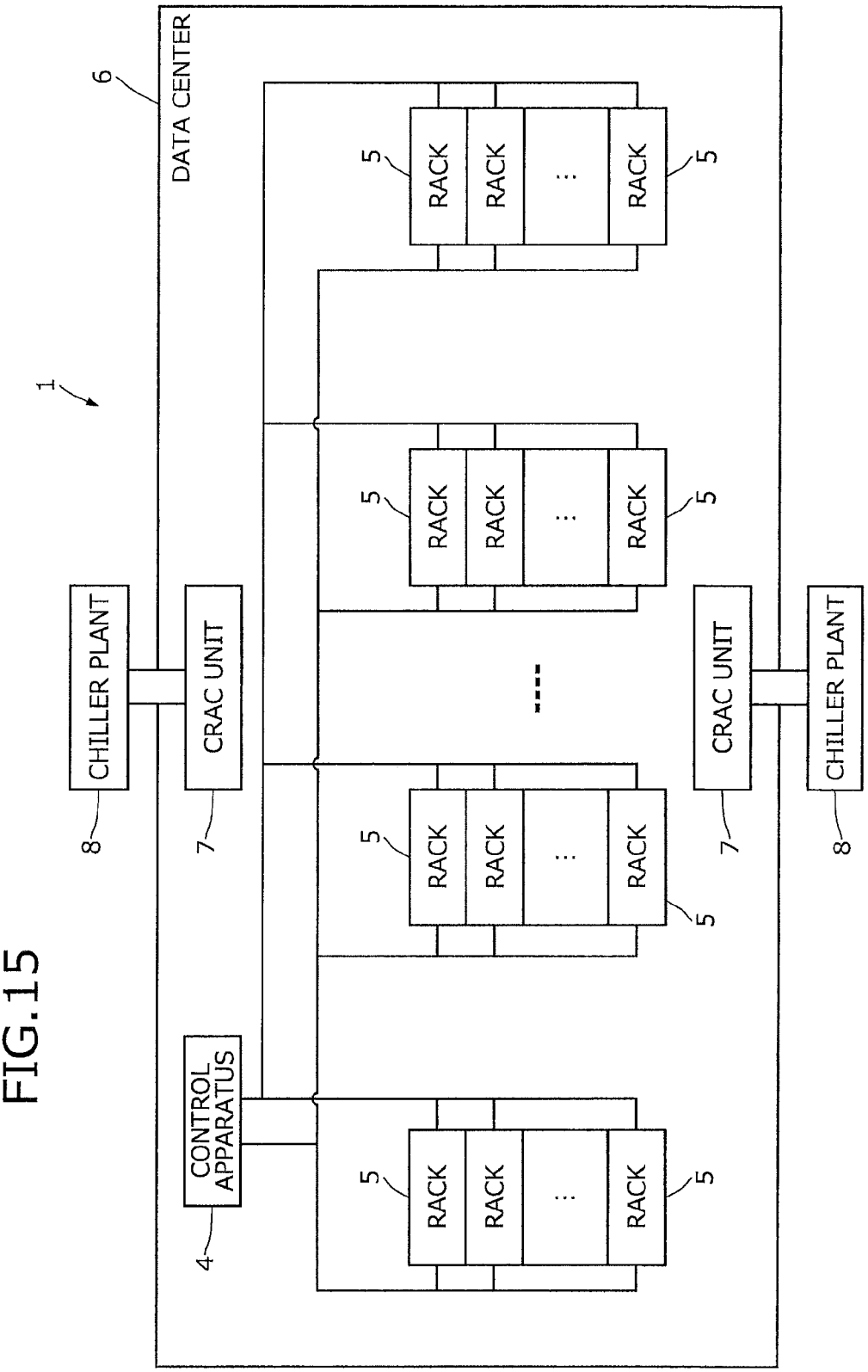
FIG. 15 is a block diagram of the computer system according to a third embodiment.

FIG. 15 is a block diagram of the computer system according to the third embodiment. As depicted in FIG. 15, the data center 6 includes space to accommodate the racks 5 and has installed therein an air conditioning apparatus that includes computer room air conditioning (CRAC) units 7 and chiller plants 8. Though not depicted in FIG. 15, the racks 5 accommodate the servers and the power supply apparatuses.

In the depicted example, two CRAC units 7 and two chiller plants 8 are depicted. However, the number of CRAC units 7 and chiller plants 8 may each be one, or three or more. Plural CRAC units 7 may be connected to one chiller plant 8. In this example, description will be made assuming that one CRAC unit 7 and one chiller plant 8 form a pair.

Figures 16, 17:
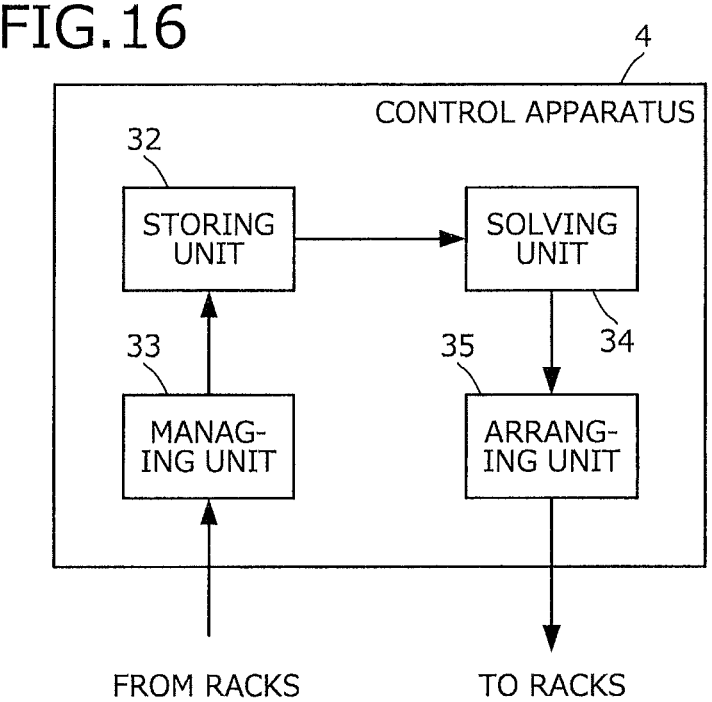
FIG. 16 is a block diagram of a functional configuration of the control apparatus of the computer system according to the third embodiment.
FIG. 17 is a diagram of data defining the size of a virtual machine in the computer system according to the third embodiment.

FIG. 16 is a block diagram of a functional configuration of the control apparatus of the computer system according to the third embodiment. As depicted in FIG. 16, the control apparatus 4 according to the third embodiment does not need to determine which one needs to be solved among the mixed integer programming problems that correspond to the initial arrangement of the virtual machines, the additional arrangement thereof, and the rearrangement thereof and therefore, the determining unit 31 in the second embodiment may be omitted.

The solving unit 34 solves the mixed integer programming problems (described hereinafter), based on the data (the constants), the variables, the objective function, and the constraints delivered from the storing unit 32. An example of the solving unit 34 can be, for example, software to solve the mixed integer programming problems (a solver). Examples of the solver can be, for example, "GLPK", "SYMPHONY", and "Gurobi Optimizer". Similar to the second embodiment, when the initial arrangement, the additional arrangement, and the rearrangement of the virtual machines are all coped with, the control apparatus 4 may be configured to include the determining unit 31 as depicted in FIG. 3.

The computer system 1 may have the data N and S defining the configuration of the data center (FIG. 4); the data M defining the number of virtual machines (FIG. 5); and the data $L_{ij}$ defining the greatest number of virtual machines (FIG. 7). The computer system 1 may have the data $\alpha_{ij}$ defining the power consumption of the virtual machines (FIG. 8); the data $\beta_{ij}$ defining the base power consumption (FIG. 9); and the base power consumption $\eta_i$ of the power supply apparatus and the data $\varepsilon_i$ defining the proportionality coefficient thereof (FIG. 13). Here, in the third embodiment, "$\alpha_{ij}$" represents the electric power consumed per unit size (for example, one core or one thread), consumed when the virtual machines operate in the j-th server in the i-th rack. In addition, the computer system 1 may include the data described below.

FIG. 17 is a diagram of data defining the size of the virtual machine in the computer system according to the third embodiment. As depicted in FIG. 17, the size of the n-th virtual machine is $\tau_n$, when M virtual machines to be arranged are numbered as 1 to M. "n" is an integer between 1 and M. Examples of the size of a virtual machine can be the number of cores used by the virtual machines arranged in a server, and the number of threads executed by a virtual machine arranged therein.

FIG. 18 is a diagram of data concerning the initial arrangement of the virtual machines in the computer system according to the third embodiment. As depicted in FIG. 18, the total size of the virtual machines already arranged as those for the initial arrangement in the j-th server in the i-th rack is $w^0_{1j}$.

FIG. 19 is a diagram of data that defines the number of air conditioning apparatuses in the computer system according to the third embodiment. As depicted in FIG. 19, the number of air conditioning apparatuses is C, each including the pair of the one CRAC unit 7 and the one chiller plant 8. "C" is a positive integer.

FIG. 20 is a diagram of data that defines the base power consumption and the proportionality coefficient of the CRAC unit in the computer system according to the third embodiment. As depicted in FIG. 20, the base power consumption continually consumed by the k-th CRAC unit is $\lambda_k$ M. "k" is an integer taking from one to C. "$\lambda_k$" is a positive real number. The proportionality coefficient is $\mu_k$ that represents how many times more the electric power consumed by the CRAC unit is compared to the heat flow entering the k-th CRAC unit. "$\mu k$" is a positive real number. In the third embodiment, the heat flow is converted into, for example, electric power necessary for consuming the heat flow.

FIG. 21 is a diagram of data that defines the proportionality coefficient of the chiller plant in the computer system according to the third embodiment. As depicted in FIG. 21, the proportionality coefficient is $\kappa_k$ that represents how many times more the electric power consumed by the chiller plant is compared to the heat flow entering the k-th chiller plant. "$\kappa_k$" is a positive real number. When the chiller plant always consumes electric power, similarly to the CRAC unit, the data concerning the chiller plant includes the data related to the base power consumption of the chiller plant.

FIG. 22 is a diagram of data defining a heat flow relation between the rack and the air conditioning apparatus in the computer system according to the third embodiment. As depicted in FIG. 22, the proportionality coefficient that represents how many times more the heat flow entering the k-th CRAC unit is compared to the heat flow discharged from the i-th rack$\phi_{ki}$. "$\phi_{ki}$" is a real number greater than or equal to zero and less than or equal to one.

FIG. 23 is a diagram of data that defines the supplied heat flow between the racks and the air conditioning apparatus in the computer system according to the third embodiment. As depicted in FIG. 23, the heat flow supplied from the CRAC unit to the i-th rack is $q_{sup,i}$ [W]. "$q_{sup,i}$" is a real number.

The values of C, $\lambda_k$, $\mu_k$, and $\kappa_k$ are determined in advance based on the configuration of the air conditioning apparatus. The values of $\phi_{ki}$ and $q_{sup,i}$ are determined in advance based on the configurations of the rack and the air conditioning apparatus. "$w^0_{ij}$" is dynamically rewritten by the managing unit 33 during the operation of the data center.

Figure 24:
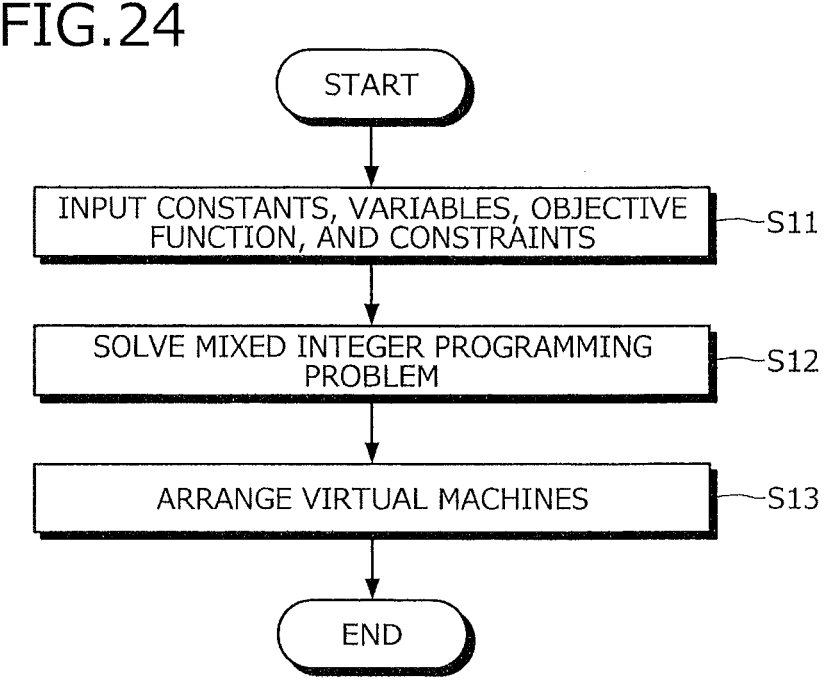
FIG. 24 is a flowchart of the virtual machine arranging method according to the third embodiment.

FIG. 24 is a flowchart of the virtual machine arranging method according to the third embodiment. As depicted in FIG. 24, when the arrangement of the virtual machines is started, the storing unit 32 inputs the data (the constants), the variables, the objective function, and the constraints into the solving unit 34 (step S11). The solving unit 34 solves the mixed integer programming problem using, for example, the solver, based on the data (the constants), the variables, the objective function, and the constraints that are input thereinto and the instruction from the determining unit 31; and obtains the solution (step S12). Formulation as the mixed integer programming problem will be described later. The arranging unit 35 arranges the virtual machines based on the solution obtained by the solving unit 34 (step S13). The series of process steps of the virtual machine arrangement process come to an end.

Formulation as a mixed integer programming problem and modeling of virtual machines and arrangement thereof will be described. As depicted in FIG. 17, it is assumed that the size of the n-th virtual machine to be arranged is represented by "$\tau_n$" and that "$x_{n,i,j}$" is a variable taking a value of zero or one. The value of $x_{n,i,j}$ is one when the n-th virtual machine is executed by the j-th server in the i-th rack, and is zero in other cases, that is, when the virtual machine is not executed. Therefore, $x_{n,i,j}$ can represent the arrangement of the virtual machine.

Modeling of the power consumption of the server, the power consumption of the power supply apparatus, the power consumption of the CRAC unit, the power consumption of the chiller plant, and the power consumption of the overall data center will be described.

The power consumption of the server can be modeled similarly to that of the second embodiment. In the third embodiment, the server has the properties of (S-1) and (S-2) described in the second embodiment and the property of (S-4) below.

(S-4) When the total size of the executed virtual machines is increased, the load increases and, corresponding to this, the power consumption increases.

The power consumption that is consumed when the virtual machines whose total size is $w^0_{ij}$ are initially arranged in the j-th server in the i-th rack and a virtual machine whose size is $\tau_n$ is further arranged in this server is expressed by Eq. (51) below. Eq. (51) expresses the properties of (S-1), (S-2), and (S-4) using linear expressions of the variables $x_{n,i,j}$ and $v_{ij}$. "$v_{ij}$" is same as that described in the second embodiment.

$$\beta_{ij}v_{ij} + \alpha_{ij}\left(w^0_{ij} + \sum_{n=1}^{M} \tau_n x_{n,i,j}\right) \quad (51)$$

The power consumption of the power supply apparatus can be modeled similarly to that of the second embodiment. In the third embodiment, the power supply apparatus has the properties of (U-1) and (U-2) described in the second embodiment. The power consumption of the server is expressed by Eq. (51) and therefore, the power consumption of the power supply apparatus is expressed by Eq. (52) below. Eq. (52) expresses the properties of (U-1) and (U-2) using the linear expressions of the variables $x_{n,i,j}$ and $v_{ij}$.

$$\eta_i + \varepsilon_i \sum_{j=1}^{S} \left(\beta_{ij}v_{ij} + \alpha_{ij}\left(w^0_{ij} + \sum_{n=1}^{M} \tau_n x_{n,i,j}\right)\right) \quad (52)$$

In modeling the power consumption of the CRAC unit, the CRAC unit has the properties of (C-1) and (C-2) concerning the power consumption thereof.

(C-1) A specific amount of electric power is always consumed.

(C-2) When the heat flow entering the k-th CRAC unit is increased, the power consumption of the k-th CRAC unit is increased.

The power consumption of the k-th CRAC unit is expressed by Eq. (53) below based on the properties of (C-1) and (C-2). In Eq. (53), "$q_{in,\,CRAC,\,k}$" represents the heat flow (unit: W) that enters the k-th CRAC unit.

$$\lambda_k + \mu_k q_{in,CRAC,k} \quad (53)$$

In the modeling of power consumption of the chiller plant, the chiller plant has the properties of (C-3) and (C-4) below concerning power consumption.

(C-3) The heat flow entering the k-th chiller plant is equal to the heat flow discharged from the k-th CRAC unit.

(C-4) When the heat flow discharged from the k-th chiller plant increases, the power consumption of the k-th chiller plant increases.

Eq. (54) below expresses the power consumption of the k-th chiller plant based on the properties of (C-3) and (C-4). In Eq. (54), $q_{out,\,CRAC,\,k}$ represents the heat flow (unit: W) flowing out from the k-th CRAC unit. When the chiller plant continually consumes electric power, similarly to the CRAC unit, a term for the base power consumption of the chiller plant is added to Eq. (54).

$$\kappa_k q_{out,CRAC,k} \quad (54)$$

The total power consumption of the servers and the power supply apparatuses in the data center is the power consumption obtained by totaling Eq. (51) for the first to the S-th servers and adding Eq. (52) to this total; this addition result for all of the first to the N-th racks. The power consumption of the overall data center is the power consumption obtained by totaling: the total power consumption of the servers and the power supply apparatuses; Eq. (53) for all of the first to the C-th CRAC units; and Eq. (54) for all of the first to the C-th chiller plants. Therefore, the power consumption of the overall data center is expressed by Eq. (55) below.

$$\sum_{i=1}^{N}\left[\eta_i + (1+\varepsilon_i)\left\{\sum_{j=1}^{S}\beta_{ij}v_{ij} + \alpha_{ij}\left(w_{ij}^0 + \sum_{n=1}^{M}\tau_n x_{n,i,j}\right)\right\}\right] + \sum_{k=1}^{C}(\lambda_k + \mu_k q_{in,CRAC,k}) + \sum_{k=1}^{C}(\kappa_k q_{out,CRAC,k}) \quad (55)$$

Modeling of the heat flows will be described. For the heat flows, the relations of (Q-1) to (Q-3) below hold between the racks and the air conditioning apparatus.

(Q-1) The heat flow discharged from each of the CRAC units is obtained by totaling the heat flow entering the CRAC unit and the heat flow generated by the CRAC unit (that is, the power consumption thereof).

(Q-2) The heat flow entering the CRAC units is the heat flow discharged from the racks.

(Q-3) The heat flow discharged from the racks is calculated by totaling the heat flow entering the racks and the heat flow generated by the racks (that is, the power consumption thereof).

Based on the relation of (Q-1), the heat flow discharged from the k-th CRAC unit is expressed by Eq. (56) below.

$$q_{out,CRAC,k} = q_{in,CRAC,k} + \lambda_k + \mu_k q_{in,CRAC,k} \quad (56)$$

Based on the relation of (Q-2), the heat flow entering the k-th CRAC unit is expressed by Eq. (57) below. In Eq. (57), "$q_{out,RACK,i}$" is a variable representing the heat flow (unit: [W]) flowing out from the i-th rack.

$$q_{in,CRAC,k} = \sum_{i=1}^{N} \psi_{ki} q_{out,RACK,i} \quad (57)$$

Based on the relation of (Q-3), the heat flow discharged from the i-th rack is expressed by Eq. (58) below.

$$q_{out,RACK,i} = q_{sup,i} + \eta_i + (1+\varepsilon_i)\left(\sum_{j=1}^{S}\beta_{ij}v_{ij} + \alpha_{ij}\left(w_{ij}^0 + \sum_{n=1}^{M}\tau_n x_{n,i,j}\right)\right) \quad (58)$$

From Eq. (58), the heat flow $q_{out,RACK,i}$ discharged from the i-th rack is a function of the variables $x_{n,i,j}$ and $v_{ij}$. Therefore, from Eq. (57), the heat flow $q_{in,CRAC,k}$ entering the k-th CRAC unit is also a function of the variables $x_{n,i,j}$ and $v_{ij}$. From Eq. (56), the heat flow $q_{out,CRAC,k}$ discharged from the k-th CRAC unit is also a function of the variables $x_{n,i,j}$ and $v_{ij}$.

From the above, the electric power saving problem of the total power consumption of the servers, the power supply apparatuses, the CRAC units, and the chiller plants consumed when the virtual machines are arranged can be formulated as a mixed integer programming problem expressed by Eqs. (59) to (66) below. Eq. (59) expresses the objective function. Eqs. (60) to (66) express the constraints. The decision variables are $x_{n,i,j}$, $v_{ij}$, $q_{in,CRAC,k}$, $q_{out,CRAC,k}$, $q_{out,RACK,i}$, n=1, ..., and M, i=1, ..., and N, j=1, ..., and S, and k=1, ..., and C.

Minimize $$\sum_{i=1}^{N}\left[\eta_i + (1+\varepsilon_i)\left\{\sum_{j=1}^{S}\beta_{ij}v_{ij} + \alpha_{ij}\left(w_{ij}^0 + \sum_{n=1}^{M}\tau_n x_{n,i,j}\right)\right\}\right] + \sum_{k=1}^{C}(\lambda_k + \mu_k q_{in,CRAC,k}) + \sum_{k=1}^{C}(\kappa_k q_{out,CRAC,k}) \quad (59)$$

$$x_{n,i,j} \in \{0,1\}, n=1,\ldots,M, i=1,\ldots,N, j=1,\ldots,S \quad (60)$$

$$v_{i,j} \in \{0,1\}, i=1,\ldots,N, j=1,\ldots,S \quad (61)$$

$$\sum_{i,j} x_{n,i,j} = 1, n=1,\ldots,M \quad (62)$$

$$w_{ij}^0 + \sum_{n=1}^{M}\tau_n x_{n,i,j} \le L_{ij}, i=1,\ldots,N, j=1,\ldots,S \quad (63)$$

$$q_{out,CRAC,k} = q_{in,CRAC,k} + \lambda_k + \mu_k q_{in,CRAC,k} k=1,\ldots,C \quad (64)$$

$$q_{in,CRAC,k} = \sum_{i=1}^{N} \psi_{ki} q_{out,RACK,i}, k=1,\ldots,C \quad (65)$$

$$q_{out,RACK,i} = q_{sup,i} + \eta_i + (1+\varepsilon_i)\left(\sum_{j=1}^{S}\beta_{ij}v_{ij} + \alpha_{ij}\left(w_{ij}^0 + \sum_{n=1}^{M}\tau_n x_{n,i,j}\right)\right), \quad (66)$$

$$i=1,\ldots,N$$

According to the third embodiment, the mixed integer programming problem is solved that uses, as the objective functions thereof, the total power consumption of the power consumption of the servers 2, the total power consumption of the power supply apparatuses 3, the total power consumption of the CRAC units 7, and the total power consumption of the chiller plants 8; and thereby, an arrangement of the virtual machines can be obtained that can minimize the total power consumption. Therefore, the electric power saving of the computer system 1 can be facilitated. Even when the size of virtual machines differs from one another, an arrangement of the virtual machines is obtained that can minimize the total power consumption and thereby, the electric power saving of the computer system 1 can be facilitated.

According to the third embodiment, the power consumption of the CRAC units 7 and that of the chiller plants 8 are each expressed by a linear expression and the mixed integer programming problem is solved; and thereby, the solution can be obtained more quickly than in a case where the power consumption of the air conditioning apparatus is obtained by thermal fluid simulation or heat exchange simulation. Consequently, the data center 6 can be smoothly operated.

According to the third embodiment, a solution can be obtained that is more suitable for the actual state of the operation of the data center 6 compared to a case where the air conditioning equipment is virtually disassembled to match with the number of servers 2 and a solution is obtained that can minimize the power consumption of the data center 6.

The size $\tau_n$ may be set to be same for all the virtual machines to be arranged. With such setting, the size becomes the same for all the virtual machines to be arranged, similarly to the second embodiment and therefore, according to the third embodiment, the effect of the electric power saving can also be achieved even when the size of all the virtual machines to be arranged is the same.

The total size $w^0_{ij}$ of the initially arranged virtual machines in all the servers 2 may be set to be zero. With such setting, in the initial state, no virtual machines are arranged in the servers 2, similar to the initial arrangement of the virtual machines in the second embodiment. Therefore, according to the third embodiment, the effect of the electric power saving can also be achieved even when the virtual machines are initially arranged.

As to the objective function of Eq. (59) and the constraints of Eqs. (64) to (66), the integer programming problem may be solved without the terms and expressions concerning the heat flows of the air conditioning apparatus. Thus, electric power saving can be facilitated in a case where virtual machines of different sizes are arranged, without taking into consideration the power consumption of the air conditioning apparatus.

A fourth embodiment is an example where, in the computer system 1 according to the third embodiment, the M virtual machines to be arranged are arranged in a single rack 5 as much as possible. In a case where, for example, the M virtual machines are included in one service, when the service executes, for example, communication, an arrangement of the M virtual machines in the same rack 5 may enable an increase of the communication speed. Components identical to those in the third embodiment are given the same reference numerals used in the third embodiment and will not again be described.

Figure 25:
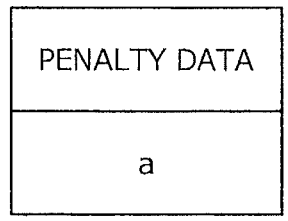
FIG. 25 is a diagram of data that defines a penalty in the computer system according to a fourth embodiment.

FIG. 25 is a diagram of data that defines a penalty in the computer system according to the fourth embodiment. As depicted in FIG. 25, the penalty is "a" [W] per one rack in a case where the virtual machines that are preferably to be arranged in the same rack 5 are arranged in plural racks 5 being distributed thereamong. The virtual machines that are preferably to be arranged in the same rack 5 tend to be arranged more in the same rack 5 as the value of "a" increases, and the effect of the electric power saving becomes higher as the value of "a" decreases. The other data structures are same as those of the third embodiment.

In the fourth embodiment, as expressed by Eq. (67), for the i-th rack, "$\sigma_i$" is an auxiliary variable taking a value of zero or one.

$$\sigma_i \in \{0,1\}, i=1,\ldots,N \tag{67}$$

A constraint expressed by Eq. (68) is imposed on $\sigma_i$.

$$\sigma_i \leq \sum_{n,j} x_{n,i,j} \leq M\sigma_i, i=1,\ldots,N \tag{68}$$

In a case where $\Sigma x_{n,i,j}$ ($\Sigma$ indexes n and j are omitted) is greater than or equal to one in Eq. (68), when $\sigma_i$ is zero, the inequality on the right side of Eq. (68) does not hold. Therefore, $\sigma_i$ is one. On the other hand, in a case where $\Sigma x_{n,i,j}$ ($\Sigma$ indexes n and j are omitted) is zero, when $\sigma_i$ is one, the inequality on the left side of Eq. (68) does not hold. Therefore, $\sigma_i$ is zero.

Therefore, the value of $\sigma_i$ indicates whether the virtual machines are executed in the i-th rack. The value of $\sigma_i$ is one when the virtual machines are executed in the i-th rack, and is zero in other cases, that is, when the virtual machines are not executed therein. Eqs. (69) and (70) express this. The total of the values of $\sigma_i$ for the first to the N-th racks is the number of racks for the newly arranged virtual machines to be executed.

$$\sigma_i = 0 \Leftrightarrow \sum_{n,j} x_{n,i,j} = 0 \tag{69}$$

$$\sigma_i = 1 \Leftrightarrow \sum_{n,j} x_{n,i,j} \geq 1 \tag{70}$$

From the above, the electric power saving problem for a case where the virtual machines are arranged preferentially in the same rack can be formulated as a mixed integer programming problem expressed by Eqs. (71) to (80) below. Eq. (71) expresses the objective function. Eqs. (72) to (80) express the constraints. The decision variables are $x_{n,i,j}$, $V_{ij}$, $\sigma_i$, $q_{in,CRAC,k}$, $q_{out,CRAC,k}$, $q_{out,RACK,i}$, n=1, ..., and M, i=1, ..., and N, j=1, ..., and S, and k=1, ..., and C.

Minimize $$\sum_{i=1}^{N}\left[\eta_i + (1+\varepsilon_i)\left\{\sum_{j=1}^{S}\beta_{ij}v_{ij} + \alpha_{ij}\left(w_{ij}^0 + \sum_{n=1}^{M}\tau_n x_{n,i,j}\right)\right\}\right] + \tag{71}$$

$$\sum_{k=1}^{C}(\lambda_k + \mu_k q_{in,CRAC,k}) + \sum_{k=1}^{C}(\kappa_k q_{out,CRAC,k}) + a\sum_{i=1}^{N}\sigma_i$$

$$x_{n,i,j} \in \{0,1\}, n=1,\ldots,M, i=1,\ldots,N, j=1,\ldots,S \tag{72}$$

$$v_{i,j} \in \{0,1\}, i=1,\ldots,N, j=1,\ldots,S \tag{73}$$

$$\sigma_i \in \{0,1\}, i=1,\ldots,N \tag{74}$$

$$\sum_{i,j} x_{n,i,j} = 1, n=1,\ldots,M \tag{75}$$

$$w_{ij}^0 + \sum_{n=1}^{M}\tau_n x_{n,i,j} \leq L_{ij}, i=1,\ldots,N, j=1,\ldots,S \tag{76}$$

$$\sigma_i \leq \sum_{n,j} x_{n,i,j} \leq M\sigma_i, i=1,\ldots,N \tag{77}$$

$$q_{out,CRAC,k} = q_{in,CRAC,k} + \lambda_k + \mu_k q_{in,CRAC,k}, k=1,\ldots,C \tag{78}$$

$$q_{in,CRAC,k} = \sum_{i=1}^{N}\psi_{ki}q_{out,RACK,i}, k=1,\ldots,C \tag{79}$$

$$q_{out,RACK,i} = q_{sup,i} + \eta_i + (1+\varepsilon_i)\left(\sum_{j=1}^{S}\beta_{ij}v_{ij} + \alpha_{ij}\left(w_{ij}^0 + \sum_{n=1}^{M}\tau_n x_{n,i,j}\right)\right), \tag{80}$$

$$i=1,\ldots,N$$

According to the fourth embodiment, the same effect as that of the third embodiment is achieved, and the arrangement of the plural virtual machines in the same rack enables improvement of the communication speed and of the electric power saving to be expected.

A fifth embodiment is an example where the virtual machines are rearranged when the size of the virtual machines differs from one another. For example, the fifth embodiment is an example where the electric power consumed by the servers, the UPSs, and the air-conditioner is modeled as a function of the arrangement of the virtual machines of different sizes. A computer system according to the fifth embodiment formulates an electric power saving problem as a mixed integer programming problem based on the virtual machine rearrangement using the virtual machine migration, obtains the solution thereof and thereby, calculates the arrangement of the virtual machines to achieve electric power saving.

Thereby, even when the size of the virtual machines differs from one another, virtual machine rearrangement that is optimal for the electric power saving can be executed. In the fifth embodiment, electric power saving will be described for the computer system depicted in FIG. 15 and the control apparatus of the computer system depicted in FIG. 16, as an example of the computer system 1 according to the first embodiment. Components identical to those in the first to the fourth embodiments are given the same reference numerals used in the first to the fourth embodiments and will not again be described.

In the fifth embodiment, the computer system 1 may have the data N and S defining the configuration of the data center (FIG. 4); the data M defining the number of virtual machines (FIG. 5); and the data $L_{ij}$ defining the greatest number of virtual machines (FIG. 7). However, in the fifth embodiment, the data M defining the number of virtual machines represents the greatest number of virtual machines included in one service. The computer system 1 may have the data $\alpha_{ij}$ defining the power consumption of the virtual machines (FIG. 8); the data $\beta_{ij}$ defining the base power consumption (FIG. 9); and the base power consumption $\eta_i$ of the power supply apparatus and the data $\epsilon_i$ defining the proportionality coefficient (FIG. 13). However, in the fifth embodiment, "$\alpha_{ij}$" represents the electric power consumed per unit size (for example, one core or one thread) when the virtual machines operate in the j-th server in the i-th rack.

In the fifth embodiment, the computer system 1 may have the data defining the number of air conditioning apparatuses (FIG. 19) and the data defining the base power consumption of the CRAC unit and the proportionality coefficient thereof (FIG. 20); and may further have the data defining the proportionality coefficient of the chiller plant (FIG. 21), the data defining the heat flow relation between the rack and the air conditioning apparatus (FIG. 22), and the data defining the supplied heat flow between the rack and the air conditioning apparatus (FIG. 23). In addition, the computer system 1 has the data described below.

Figures 26, 27, 28:
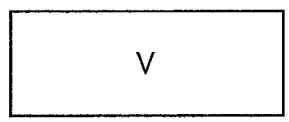
FIG. 26 is a diagram of data defining the number of services in the computer system according to a fifth embodiment.
FIG. 27 is a diagram of data defining the number of virtual machines for each of the services in the computer system according to the fifth embodiment.
FIG. 28 is a diagram of data defining the size of the virtual machine in the computer system according to the fifth embodiment.

FIG. 26 is a diagram of data defining the number of services in the computer system according to the fifth embodiment. The service count V is the number of services provided in the computer system. A service is executed by one or more virtual machine(s). "V" is an integer greater than or equal to one.

FIG. 27 is a diagram of data defining the number of virtual machines for each of the services in the computer system according to the fifth embodiment. In FIG. 27, the "number" is identification information used to uniquely identify each service; and the "quantity" is the number of virtual machines for each service. For example, the number of virtual machines used for the service of the service number "1" is "$M_3$", and the number of virtual machines used for the service of the service number "V" is "$M_v$".

FIG. 28 is a diagram of data defining the size of the virtual machine in the computer system according to the fifth embodiment. FIG. 28 depicts the size of each virtual machine in a case where the services to be provided are given the numbers 1 to V and the virtual machines to be arranged in each service are given the numbers 1 to M. For example, the size is "$\tau_{VM}$" of the "M"-th virtual machine to be started up for the service whose service number is "V". An example of the size of the virtual machine can be the number of cores used by the virtual machine arranged in the server, or the number of threads executed by the virtual machine arranged in the server.

FIG. 29 is a flowchart of the virtual machine arranging method according to the fifth embodiment. As depicted in FIG. 29, when the arrangement of the virtual machines is started, the storing unit 32 inputs the data (the constants), the variables, the objective function, and the constraints into the solving unit 34 (step S51). The solving unit 34 solves the mixed integer programming problem using, for example, the solver based on the data (the constants), the variables, the objective function, and the constraints input thereinto and the instruction from the determining unit 31; and obtains the solution (step S52). The formulation as the mixed integer programming problem will be described later. The arranging unit 35 arranges the virtual machines based on the solution obtained by the solving unit 34 (step S53). The series of process steps of the virtual machine arrangement process come to an end.

Formulation of the mixed integer programming problem according to the fifth embodiment will be described. In the fifth embodiment, similar to the third embodiment, the power consumption of the CRAC unit and that of the chiller plant are also modeled. However, the modeling of the power consumption of the CRAC unit and that of the chiller plant are same as those in the third embodiment and therefore, will not again be described.

Modeling of a virtual machine and virtual machine arrangement will be described. The service count is "V" as depicted in FIG. 26, and the greatest number of virtual machines used in one service is "M" as depicted in FIG. 27. Therefore, the size of the n-th virtual machine in the m-th service is represented by "$\tau_{mn}$". When the number $M_m$ of virtual machines used in the m-th service is $M_m < M$, $\tau_{mn}$ are set to be $\tau_{mn} = 0$ for $n = M_n+1, \ldots,$ and M.

"$x_{m,n,i,j}$" is a variable that takes a value of "one" when the n-th virtual machine of the m-th service is executed by the j-th server in the i-th rack, and takes a value of "zero" when the n-th virtual machine is not executed thereby. "$w_{ij}$" is a variable representing the total size of the virtual machines executed by the j-th server in the i-th rack. In this case, $x_{m,n,i,j}$ and $w_{ij}$ are related to one another as expressed by Eq. (81).

$$w_{ij} = \Sigma_{m,n} \tau_{mn} x_{m,n,i,j} \tag{81}$$

Modeling of power consumption of a server will be described. The execution of at least one virtual machine by the j-th server in the i-th rack is indicative of the power of the server already being turned on. Therefore, the turning on of the power consumes some electric power. When the total size of the virtual machines executed by the j-th server in the i-th rack increases, the load increases and more electric power is consumed. Therefore, the power consumption of the j-th server in the i-th rack is modeled as below.

$$\beta_{ij} v_{ij} + \alpha_{ij} \Sigma_{m=1}^{V} \Sigma_{n=1}^{M} \tau_{mn} x_{m,n,i,i} \tag{82}$$

In Eq. (82), "$v_{ij}$" is a variable representing the turning on or off of the j-th server in the i-th rack, takes a value of "one" for the turning on, and a value of "zero" for the turning off. "$\beta_{ij}$" represents the base power consumption consumed by the j-th server alone when the j-th server in the i-th rack is turned on, and is a constant whose unit is [W]. "$\alpha_{ij}$" represents the electric power consumed per unit size (one core or one thread) by the j-th server in the i-th rack, and is also a constant whose unit is [W (watt)].

Modeling of power consumption of the UPS will be described. The UPS continually consumes a specific amount of electric power. In addition, electric power is consumed of an amount corresponding to the power consumption of the servers mounted on the rack to which the UPS is equipped. Therefore, the power consumption of the UPS in the i-th rack is modeled as below.

$$\eta_i + \epsilon_i \Sigma_{j=1}^{S}(\beta_{ij}v_{ij} + \alpha_{ij}\Sigma_{m,n}\tau_{mn}x_{m,n,i,j}) \tag{83}$$

In Eq. (83), "S" represents the number of servers per one rack, and is a constant. "$\eta_i$" represents the base power consumption continually consumed by the UPS in the i-th rack, and is a constant whose unit is [W (watt)] (see FIG. 13). "$\epsilon$" is a proportionality coefficient that represents how many times more the electric power consumed by the UPS is compared to the power consumption of the server in the i-th rack; and is a constant (see FIG. 13). A state where the number of servers in the i-th rack is "s" (<S) can be expressed by a constraint that $x_{m,n,i,j}=0$ for j≥s. The number of servers in the rack is variable.

Items for the overall data center are modeled such as the electric power consumed by the servers, the UPSs, the CRAC units, and the chiller plants, respectively.

$$\sum_{i=1}^{N}\left[\eta_i + (1+\epsilon_i)\left\{\sum_{j=1}^{S}\left(\beta_{ij}v_{ij} + \alpha_{ij}\sum_{m,n}\tau_{mn}x_{m,n,i,j}\right)\right\}\right] + \tag{84}$$

$$\sum_{k=1}^{C}(\lambda_k + \mu_k q_{in,CRAC,k}) + \sum_{k=1}^{C}(\kappa_k q_{out,CRAC,k})$$

In Eq. (84): "N" represents the number of racks in the data center; "C" represents the respective number of the CRAC units and the chiller plants in the data center.

Based on the relation of (C-1) described in the third embodiment, the heat flow discharged from the k-th CRAC unit is as expressed by Eq. (56). Based on the relation of (Q-2) described in the third embodiment, the heat flow entering the k-th CRAC unit is as expressed by Eq. (57). Based on the relation of (Q-3) described in the third embodiment, the heat flow discharged from the i-th rack is expressed by Eq. (85) below.

$$q_{out,RACK,i} = q_{sup,i} + \eta_i + (1+\epsilon_i)\left\{\sum_{j=1}^{S}\left(\beta_{ij}v_{ij} + \alpha_{ij}\sum_{m,n}\tau_{mn}x_{m,n,i,j}\right)\right\} \tag{85}$$

In Eq. (85), "$q_{sup,i}$" represents the heat flow supplied from the CRAC unit to the i-th rack, and is a constant whose unit is [W (watt)].

Modeling of migration cost will be described. When the migration of the virtual machines is executed, the migration source and the migration destination of the virtual machine consume some electric power. Therefore, the power consumption of the migration of the virtual machines is modeled as below.

$$\Sigma_{i=1}^{N}\Sigma_{j=1}^{S}\gamma_{ij}^{-}z_{ij}^{-} + \Sigma_{i=1}^{N}\Sigma_{j=1}^{S}\gamma_{ij}^{+}z_{ij}^{+} \tag{86}$$

Where, $z_{ij}^{-}$: An integer variable greater than or equal to zero and less than or equal to $L_{ij}$, whereby $w_{ij} - w_{ji}^{0} \geq 1 \rightarrow z_{ij}^{-} = 0$, and $w_{ij} - w_{ji}^{0} \leq 0 \rightarrow z_{ij}^{-} = -(w_{ij} - w_{ji}^{0})$ $z_{ij}^{+}$: An integer variable greater than or equal to zero and less than or equal to $L_{ij}$, whereby $w_{ij} - w_{ji}^{0} \geq 0 \rightarrow z_{ij}^{+} = w_{ij} - w_{ji}^{0}$, and $w_{ij} - w_{ji}^{0} \leq 0 \rightarrow z_{ij}^{+} = 0$ $w_{ij}$: An integer variable greater than or equal to zero and less than or equal to $L_{ij}$ and represents the total size of the virtual machines executed by the server (i, j)

$w_{ij}^{0}$: The total size (a constant) of the virtual machines already arranged in the server (i, j)

$\gamma_{ij}^{-}$: The electric power consumed per unit size when the virtual machine leaves the j-th server in the i-th rack=(a constant, unit: [W (watt)])

$\gamma_{ij}^{1}$: The electric power consumed per unit size when one virtual machine enters from the j-th server in the i-th rack=(a constant, unit: [W (watt)])

Thus, the electric power minimization problem of the servers, the UPSs, the CRAC units, and the chiller plants for the rearrangement of the virtual machines can be formulated as a mixed integer programming problem below.

$$\sum_{i=1}^{N}\left[\eta_i + (1+\epsilon_i)\left\{\sum_{j=1}^{S}\beta_{ij}v_{ij} + \alpha_{ij}\sum_{m,n}\tau_{mn}x_{m,n,i,j}\right\}\right] + \tag{87}$$

$$\sum_{k=1}^{C}(\lambda_k + \mu_k q_{in,CRAC,k}) + \sum_{k=1}^{C}(\kappa_k q_{out,CRAC,k}) +$$

$$c\left(\sum_{i=1}^{N}\sum_{j=1}^{S}\gamma_{ij}^{-}z_{ij}^{-} + \sum_{i=1}^{N}\sum_{j=1}^{S}\gamma_{ij}^{+}z_{ij}^{+}\right)$$

The mixed integer programming problem merely has to be solved such that the value of Eq. (87) is minimized. A proper method of determining the scaling factor c (>0) may be an equation "c=the average time period of the migration of the virtual machines/the average operation time period of the virtual machines after the rearrangement". Eq. (87) complies with the conditions expressed by Eqs. (88) to (107) below.

$$x_{m,n,i,j} \in \{0,1\}, m=1,\ldots,V, n=1,\ldots,M, i=1,\ldots,N, \quad j=1,\ldots,S \tag{88}$$

$$w_{ij} \in \{0,1,\ldots,L_{ij}\}, i=1,\ldots,N, j=1,\ldots,S \tag{89}$$

$$v_{ij} \in \{0,1\}, i=1,\ldots,N, j=1,\ldots,S \tag{90}$$

$$z_{ij}^{-} \in \{0,1,\ldots,L_{ij}\}, i=1,\ldots,N, j=1,\ldots,S \tag{91}$$

$$z_{ij}^{+} \in \{0,1,\ldots,L_{ij}\}, i=1,\ldots,N, j=1,\ldots,S \tag{92}$$

$$\delta_{ij}^{-} \in \{0,1\}, i=1,\ldots,N, j=1,\ldots,S \tag{93}$$

$$\delta_{ij}^{+} \in \{0,1\}, i=1,\ldots,N, j=1,\ldots,S \tag{94}$$

$$\sum_{i,j} x_{m,n,i,j} = 1, m=1,\ldots,V, n=1,\ldots,M \tag{95}$$

$$\sum_{m,n} \tau_{mn}x_{m,n,i,j} \leq L_{ij}, i=1,\ldots,N, j=1,\ldots,S \tag{96}$$

$$w_{ij} = \sum_{m,n} \tau_{mn}x_{m,n,i,j}, i=1,\ldots,N, j=1,\ldots,S \tag{97}$$

$$v_{ij} \leq \sum_{m,n} \tau_{mn}x_{m,n,i,j} \leq L_{ij}v_{ij}, i=1,\ldots,N, j=1,\ldots,S \tag{98}$$

-continued $$d + (-L_{ij} - d)\delta_{ij}^- \le w_{ij} - w_{ij}^0 \le L_{ij}(1 - \delta_{ij}^-), i = 1, \ldots, N, \quad (99)$$
$$j = 1, \ldots, S$$

$$-L_{ij}\delta_{ij}^- \le z_{ij}^- \le L_{ij}\delta_{ij}^-, i = 1, \ldots, N, j = 1, \ldots, S \quad (100)$$

$$-(w_{ij} - w_{ij}^0) - L_{ij}(1 - \delta_{ij}^-) \le z_{ij}^- \le -(w_{ij} - w_{ij}^0) + L_{ij}(1 - \delta_{ij}^-), \quad (101)$$
$$i = 1, \ldots, N, j = 1, \ldots, S$$

$$\delta_{ij}^+ = 1 - \delta_{ij}^-, i = 1, \ldots, N, j = 1, \ldots, S \quad (102)$$

$$-L_{ij}\delta_{ij}^+ \le z_{ij}^+ \le L_{ij}\delta_{ij}^+, i = 1, \ldots, N, j = 1, \ldots, S \quad (103)$$

$$(w_{ij} - w_{ij}^0) - L_{ij}(1 - \delta_{ij}^+) \le z_{ij}^+ \le (w_{ij} - w_{ij}^0) + L_{ij}(1 - \delta_{ij}^+), \quad (104)$$
$$i = 1, \ldots, N, j = 1, \ldots, S$$

$$q_{out,CRAC}^k = q_{in,CRAC}^k + \lambda_k + \mu_k q_{in,CRAC}^k, k = 1, \ldots, C \quad (105)$$

$$q_{in,CRAC}^k = \sum_{i=1}^{N} \psi_{ki} q_{out,RACK}^i, k = 1, \ldots, C \quad (106)$$

$$q_{out,RACK}^i = q_{sup}^i + \eta_i + (1 + \varepsilon_i) \left\{ \sum_{j=1}^{S} \left( \beta_{ij} v_{ij} + \alpha_{ij} \sum_{m,n} \tau_{mn} x_{m,n,i,j} \right) \right\}, \quad (107)$$
$$i = 1, \ldots, N$$

In Eq. (88), "$x_{m,n,i,j}$" represents a variable that takes a value of zero or one. The value of $x_{m,n,i,j}$ takes a value of "one" when the n-th virtual machine in the m-th service is executed (arranged) by the j-th server in the i-th rack, and takes a value of "zero" in other cases. "$x_{m,n,i,j}$" represents the arrangement of the virtual machine.

In Eq. (93), $\delta^-_{ij}$ is a variable that takes a value of zero or one. The constraint expressed by Eq. (99) is imposed on $\delta^-_{ij}$. "d" is a positive real number smaller than one. Based on the constraint expressed by Eq. (99), $\delta^-_{ij}$ satisfies the relations below.

$$w_{ij} - w_{ij}^0 \le 0 \Leftrightarrow \delta_{ij}^- = 1 \quad (108)$$

$$w_{ij} - w_{ij}^0 \ge 1 \Leftrightarrow \delta_{ij}^- = 0 \quad (109)$$

"$\delta^-_{ij}$" has been described in the above order. However, conversely, "a variable that takes a value of zero or one and that satisfies Eqs. (108) and (109)" is necessary and therefore, Eq. (99) is imposed on the variable $\delta^-_{ij}$ as a constraint to cause $\delta^-_{ij}$ to have the above property.

In Eqs. (110) and (111), is a variable that takes a value of zero or one as expressed by Eq. (94). The constraint expressed by Eq. (102) is imposed on $\delta^+_{ij}$. Based on the constraint expressed by Eq. (102), $\delta^+_{ij}$ satisfies the relations below.

$$w_{ij} - w_{ij}^0 \le 0 \Leftrightarrow \delta_{ij}^+ = 0 \quad (110)$$

$$w_{ij} - w_{ij}^0 \ge 1 \Leftrightarrow \delta_{ij}^+ = 1 \quad (111)$$

In Eqs. (112) and (113), "$v_{ij}$" is a variable that takes a value of zero or one as expressed in Eq. (90). The constraint expressed by Eq. (98) is imposed on $v_{ij}$. Based on the constraint expressed in Eq. (98), $v_{ij}$ satisfies the relations below.

$$\sum_{m,n} \tau_{mn} x_{m,n,i,j} \ge 1 \Leftrightarrow v_{ij} = 1 \quad (112)$$

$$\sum_{m,n} \tau_{mn} x_{m,n,i,j} = 0 \Leftrightarrow v_{ij} = 0 \quad (113)$$

"$\Sigma_{m,n} \tau_{mn} x_{m,n,i,j}$" represents the total size of the virtual machines arranged in the j-th server in the i-th rack and therefore, "$\Sigma_{m,n} \tau_{mn} x_{m,n,i,j} = 0$" represents that no virtual machine is arranged in the j-th server in the i-th rack. No virtual machine being arranged in the j-th server in the i-th rack is indicated by $v_{ij}$ being "zero", and one or more virtual machine(s) being arranged in the j-th server in the i-th rack is indicated by $v_{ij}$ being "one". In the fifth embodiment, it is assumed that the power of the server is turned off to reduce power consumption when no virtual machine is arranged in the server. Therefore, "$v_{ij}=1$" represents that the power of the j-th server in the i-th rack is turned on, and "$v_{ij}=0$" represents that the power of the j-th server in the i-th rack is turned off.

As described, the mixed integer programming problem formulated in the fifth embodiment is solved by and the solution thereof is obtained by the solver such as GLPK, SYMPHONY, or Gurobi Optimizer. Even when the sizes of the virtual machines are different from each other, the control apparatus of the computer system executes the migration of the virtual machines according to the solution obtained by the solver and thereby, the electric power saving of the data center can be facilitated.

A sixth embodiment is an example where virtual machines in the same service are arranged preferentially in the servers in the same rack. In the computer system, the servers are each connected to a network switch and each communicates with other servers through the network switch. Therefore, the communication delay among the servers connected to the same network switch is shorter than that for communication among the servers connected to different network switches. Similarly, when the servers each having a virtual machine arranged therein are connected to the same network switch, the delay of the communication among the virtual machines is also shorter than that among the virtual machines arranged in servers connected to different network switches.

Therefore, preferably, the virtual machines are arranged in servers connected to the same network switch, to reduce the communication delay among the virtual machines constituting one service. In the sixth embodiment, a state is assumed that one network switch is equipped to each of the racks and the servers in the rack are connected to the one network switch. Therefore, the virtual machines being arranged in the servers connected to the same network switch is indicative of the virtual machines being arranged in servers in the same rack. An example will be described where auxiliary variables are introduced, the objective function is changed and thereby, the electric power saving is achieved and the virtual machines included in the same service are arranged in one rack as much as possible.

In the sixth embodiment, as an example of the computer system 1 according to the first embodiment, electric power saving will be described of the computer system depicted in FIG. 15 and the control unit of the computer system depicted in FIG. 16. It is assumed that each of the racks of the computer system depicted in FIG. 15 includes a network switch connected to the servers in the rack. Components identical to those on the first to the fifth embodiments are given the same reference numerals used in the first to the fifth embodiments and will not again be described.

In the sixth embodiment, the computer system 1 has the data N and S defining the configuration of the data center (FIG. 4); the data M defining the number of virtual machines (FIG. 5); and the data $L_{ij}$ defining the greatest number of virtual machines (FIG. 7). However, to add to the fifth embodiment, the data M defining the number of virtual machines represents the greatest number of virtual machines included in one service. The computer system 1 has the data $\alpha_{ij}$ defining the power consumption of the virtual machines (FIG. 8); the data $\beta_{ij}$ defining the base power consumption (FIG. 9); and the base power consumption $\eta_i$ of the power supply apparatus and the data $\epsilon_i$ defining the proportionality coefficient (FIG. 13). However, to add to the fifth embodiment, "$\alpha_{ij}$" represents the electric power consumed per unit size (for example, one core or one thread) consumed when the virtual machines operate in the j-th server in the i-th rack.

In the sixth embodiment, the computer system 1 may have the data defining the size of the virtual machines (FIG. 17), the data concerning the initial arrangement of the virtual machines (FIG. 18), the data defining the number of air conditioning apparatuses (FIG. 19), and the data defining the base power consumption and the proportionality coefficient of the CRAC unit (FIG. 20). In the sixth embodiment, the computer system 1 may further have the data defining the proportionality coefficient of the chiller plant (FIG. 21); the data defining the heat flow relation between the rack and the air conditioning apparatus (FIG. 22), and the data defining the supplied heat flow between the rack and the air conditioning apparatus (FIG. 23).

To add to the fifth embodiment, the computer system 1 of the sixth embodiment may have the data defining the number of services (FIG. 26), the data defining the number of virtual machines for each service (FIG. 27), and the data defining the size of the virtual machine (FIG. 28). In addition, the computer system 1 includes the data described below.

FIG. 30 is a diagram of data defining the used-rack count penalty coefficient in the computer system according to the sixth embodiment. The "used-rack count penalty" is a penalty imposed when the virtual machines included in the same service are distributed in plural racks, and is for disposing the virtual machines included in the same service in one rack as much as possible. The "used-rack count penalty coefficient" is a constant given to the used-rack count penalty. The used-rack count penalty is used for the mixed integer programming problem.

Figure 31:
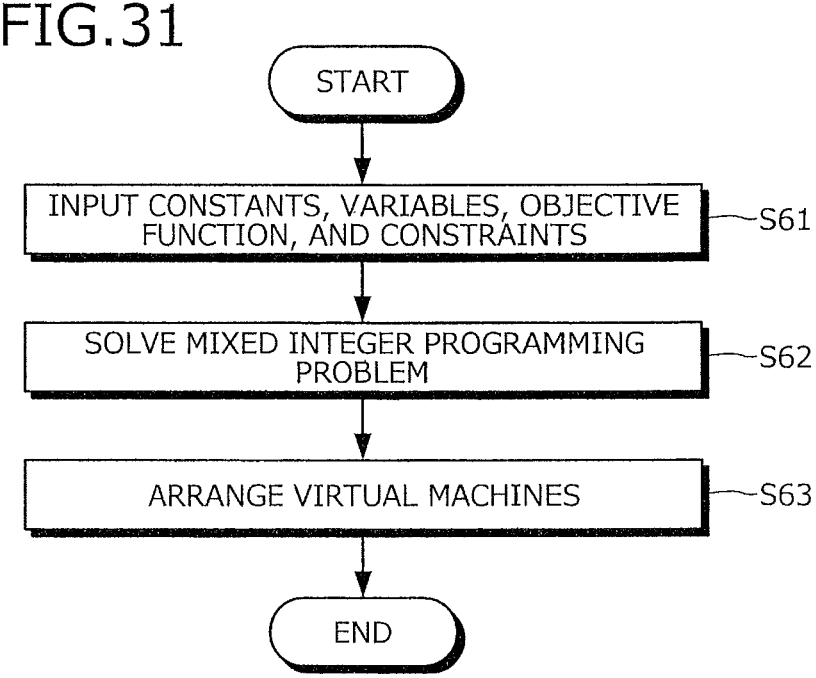
FIG. 31 is a flowchart of the virtual machine arranging method according to the sixth embodiment.

FIG. 31 is a flowchart of the virtual machine arranging method according to the sixth embodiment. As depicted in FIG. 31, when the arrangement of the virtual machines is started, the storing unit 32 inputs the data (the constants), the variables, the objective function, and the constraints into the solving unit 34 (step S61). The solving unit 34 solves the mixed integer programming problem using, for example, the solver, based on the data (the constants), the variables, the objective function, and the constraints that are input thereinto and the instruction from the determining unit 31; and obtains the solution (step S62). Formulation as the mixed integer programming problem will be described later. The arranging unit 35 arranges the virtual machines based on the solution obtained by the solving unit 34 (step S63). The series of process steps of the virtual machine arrangement process come to an end.

Formulation of the mixed integer programming problem according to the sixth embodiment will be described. Contents identical to that of the modeling described in each of the first to the fifth embodiments will not again be described.

Modeling of preferential arrangement to the same rack will be described. The used-rack count penalty is expressed by Eq. (114).

$$a\sum_{i=1}^{N}\sigma_{m,i} \tag{114}$$

$$\sigma_{m,i}: \sigma_{m,i}=0 \Leftrightarrow \Sigma_{n,j}z_{m,n,i,j}=0 \tag{115}$$

$$\sigma_{m,i}=1 \Leftrightarrow \Sigma_{n,j}x_{m,n,i,j}\geq 1 \tag{116}$$

Eq. (115) expresses that none of the virtual machines of the m-th service is arranged in the i-th rack. Eq. (116) expresses that one or more of the virtual machines of the m-th service is/are arranged in the i-th rack. "$\Sigma\sigma_{m,i}$" in Eq. (114) represents the number of racks for the virtual machines included in the m-th service to be executed thereby. "a" is the used-rack count penalty coefficient. The used-rack count penalty coefficient a is the penalty coefficient per one rack, and is a constant whose unit is [W (watt)].

Based on the above, the electric power minimization problem of the servers, the UPSs, the CRAC units, and the chiller plants by the rearrangement of the virtual machines can be formulated as a mixed integer programming problem below. Eq. (117) complies with the condition expressed by Eq. (108) in addition to those expressed by Eqs. (88) to (107).

Minimize $$\sum_{i=1}^{N}\left[\eta_i+(1+\varepsilon_i)\left\{\sum_{j=1}^{S}\beta_{ij}v_{ij}+\alpha_{ij}\sum_{m,n}\tau_{mn}x_{m,n,i,j}\right\}\right]+ \tag{117}$$

$$\sum_{k=1}^{C}(\lambda_k+\mu_k q_{in,CRAC,k})+\sum_{k=1}^{C}(\kappa_k q_{out,CRAC,k})+$$

$$c\left(\sum_{i=1}^{N}\sum_{j=1}^{S}\gamma_{ij}^{-}z_{ij}^{-}+\sum_{i=1}^{N}\sum_{j=1}^{S}\gamma_{ij}^{+}z_{ij}^{+}\right)+a\sum_{m,i}\sigma_{m,i}$$

$$\sigma_{m,i}\in\{0,1\}, m=1,\ldots,V, i=1,\ldots,N \tag{118}$$

The mixed integer programming problem merely has to be solved such that the value of Eq. (117) is minimized. Eq. (117) is an equation formed by adding Eq. (114) to Eq. (87) described in the fifth embodiment. When the virtual machines constituting the same service are distributed among plural racks, the value of the last term of Eq. (117) increases. On the other hand, when the virtual machines are gathered in the same rack, the value of the term decreases. The rack-use penalty may be applied to Eq. (36) of the second embodiment, Eq. (59) of the third embodiment, and Eq. (71) of the fourth embodiment.

As described, the mixed integer programming problem formulated in the sixth embodiment is solved by, for example, the solver such as GLPK, SYMPHONY, or Gurobi Optimizer. The control apparatus of the computer system executes the migration of the virtual machines according to the solution obtained by the solver and rearranges the virtual machines. Thereby, the electric power saving of the data center can be facilitated considering that the virtual machines included in the same service are arranged in the same rack as much as possible.

A seventh embodiment is an example of electric power saving that takes into consideration the startup stand-by time period, the virtual machine down time, and the migration stand-by time period. The "startup stand-by time period" is a stand-by time period caused by the starting up of the server. A specific time period is necessary for the virtual machines to be arranged after the turning on of the power of the server, and the startup stand-by time period is the stand-by time period generated thereby. The "virtual machine down time" is a time period generated by a discontinuation of the operation of the virtual machines. When the migration of the virtual machines is executed, each of the virtual machines discontinues the operation thereof for a time period proportional to the size of the virtual machine. The virtual machine down time is the time period generated thereby.

The "migration stand-by time period" is a stand-by time period generated by the migration of the virtual machines. Each server receives the virtual machines one virtual machine at one time. The migration stand-by time period is a stand-by time period for the reception generated when many virtual machines are rearranged in one server.

Figure 32:
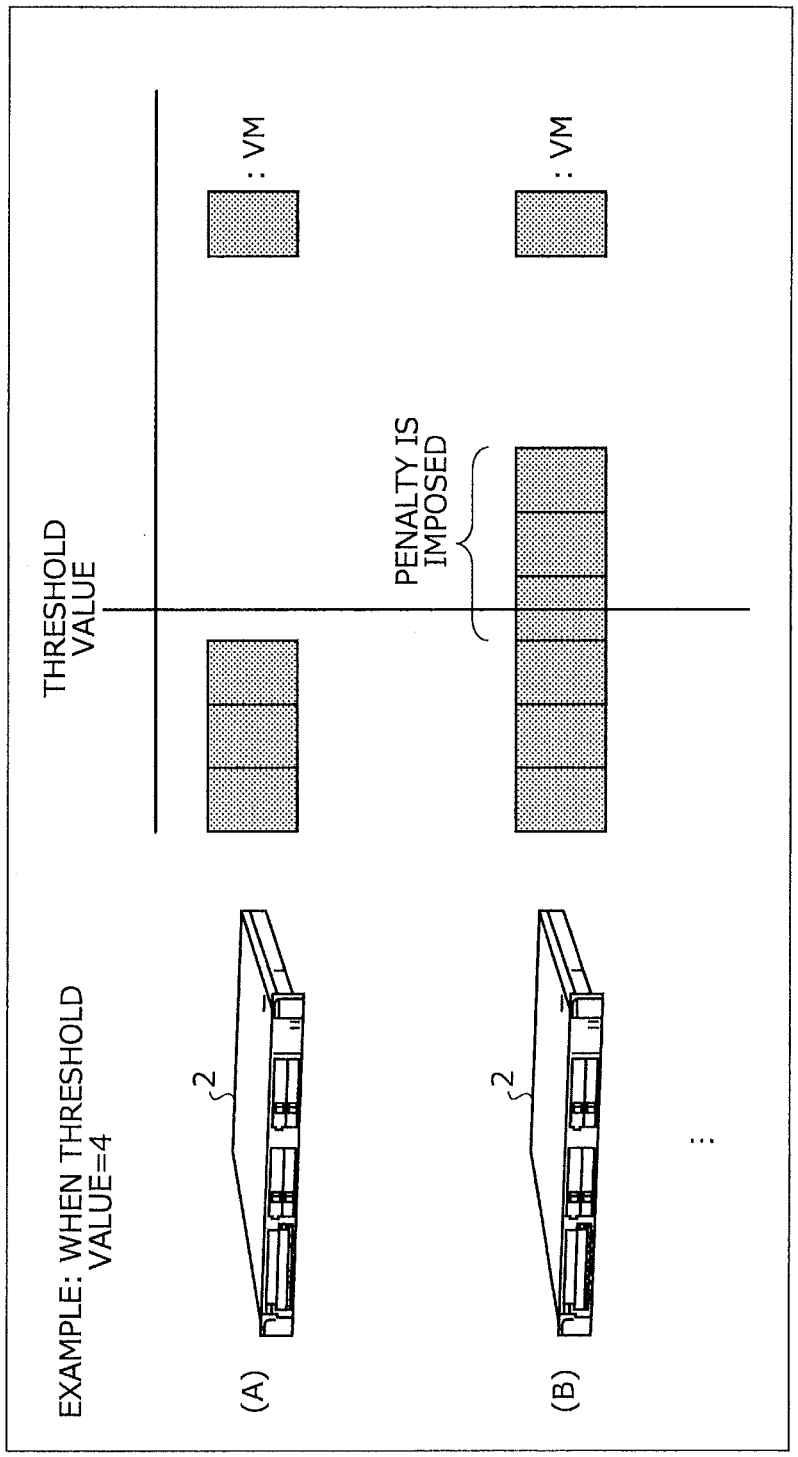
FIG. 32 is an explanatory diagram of a migration stand-by time period.

FIG. 32 is an explanatory diagram of the migration stand-by time period. When plural virtual machines move in, the virtual machines are listed and each one of the virtual machines undergoes a move process at one time. In FIG. 32, it is assumed that the threshold value for the number of standing-by virtual machines is four and that, when the number of standing-by virtual machines becomes greater than or equal to four, a penalty is imposed. In (A), the number of listed standing-by virtual machines is three and is smaller than the threshold value and therefore, no penalty is imposed. On the other hand, in (B), the number of listed standing-by virtual machines is six and is greater than or equal to the threshold value and therefore, a penalty is imposed. A method will be described of reducing the stand-by time periods and the down time as much as possible in addition to saving the electric power, by introducing the auxiliary variables and changing the objective function.

In the seventh embodiment, the computer system 1 has the data N and S defining the configuration of the data center (FIG. 4); the data M defining the number of virtual machines (FIG. 5); and the data $L_{ij}$ defining the greatest number of virtual machines (FIG. 7). However, to add to the fifth embodiment, the data M defining the number of virtual machines represents the greatest number of virtual machines included in one service. The computer system 1 has the data $\alpha_{ij}$ defining the power consumption of the virtual machines (FIG. 8); the data $\beta_{ij}$ defining the base power consumption (FIG. 9); and the base power consumption $\eta i$ of the power supply apparatus and the data $\epsilon_i$ defining the proportionality coefficient (FIG. 13). However, to add to the fifth embodiment, "$\alpha_{ij}$" represents the electric power consumed per unit size (for example, one core or one thread) when the virtual machines operate in the j-th server in the i-th rack.

In the seventh embodiment, the computer system 1 may have the data defining the size of the virtual machines (FIG. 17), the data on the initial arrangement of the virtual machines (FIG. 18), the data defining the number of air conditioning apparatuses (FIG. 19), and the data defining the base power consumption and the proportionality coefficient of the CRAC unit (FIG. 20). In the seventh embodiment, the computer system 1 may also include the data defining the proportionality coefficient of the chiller plant (FIG. 21); the data defining the heat flow relation between the rack and the air conditioning apparatus (FIG. 22), and the data defining the supplied heat flow between the rack and the air conditioning apparatus (FIG. 23).

To add to the fifth embodiment, the computer system 1 of the seventh embodiment may include the data defining the service count (FIG. 26), the data defining the number of virtual machines for each service (FIG. 27), and the data defining the size of the virtual machine (FIG. 28). In addition, the computer system 1 has the data described below.

FIG. 33 is a diagram of the data defining a startup stand-by time period penalty coefficient in the computer system according to the seventh embodiment. The "startup stand-by time period penalty" is a penalty assigned corresponding to the startup stand-by time period. The "startup stand-by time period penalty coefficient" is a value given to the startup stand-by time period penalty and the unit thereof is [W (watt)]. The startup stand-by time period penalty is used for the mixed integer programming problem. In FIG. 33, the startup stand-by time period penalty coefficient "$b_{ij}$" is defined for the j-th server in the i-th rack. For example, the startup stand-by time period penalty coefficient for the S-th server in the N-th rack is represented by "$b_{NS}$". The startup stand-by time period penalty coefficient $b_{ij}$ is determined based on the time period that elapses from the turning on of the server until the start of solving the mixed integer programming program.

FIG. 34 is an explanatory diagram of an example of a table to determine the value of the startup stand-by time period penalty coefficient $b_{ij}$. In FIG. 34, the value of the startup stand-by time period penalty coefficient increases as the elapsing time period decreases and therefore, the penalty increases. This is because the startup stand-by time period after elapse of the time period increases as the elapsing time period decreases.

Figure 35:
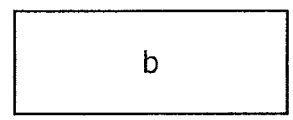
FIG. 35 is a diagram of data that defines a virtual machine down time penalty coefficient.

FIG. 35 is a diagram of the data that defines the virtual machine down time penalty coefficient. The "virtual machine down time penalty" is a penalty assigned corresponding to the virtual machine down time. The "virtual machine down time penalty coefficient b" is a constant given to the virtual machine down time penalty and the unit thereof is [W (watt)].

Figure 36:
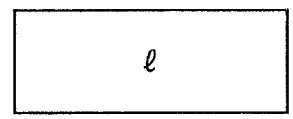
FIG. 36 is a diagram of data that defines a threshold value for the number of virtual machines standing by for migration.

FIG. 36 is a diagram of the data that defines the threshold value for the number of virtual machines standing by for migration. In the example depicted in FIG. 32, the threshold value l of the standing-by virtual machines is l=4.

Figure 37:
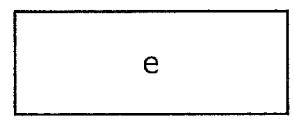
FIG. 37 is a diagram of a penalty coefficient for the number of standing-by virtual machines by which a threshold value l is exceeded.

FIG. 37 is a diagram of the penalty coefficient for the number of standing-by virtual machines by which the threshold value l is exceeded. In the example indicated by (B) in FIG. 32, the number of standing-by virtual machines is "six" and the threshold value is "four" and therefore, the number of standing-by virtual machines by which the threshold value l is exceeded is two (=6−4). Therefore, the penalty coefficient e is the penalty to be imposed on the number of standing-by virtual machines "two" by which the threshold value l is exceeded. The unit of the penalty coefficient e is [W (watt)].

Figure 38:
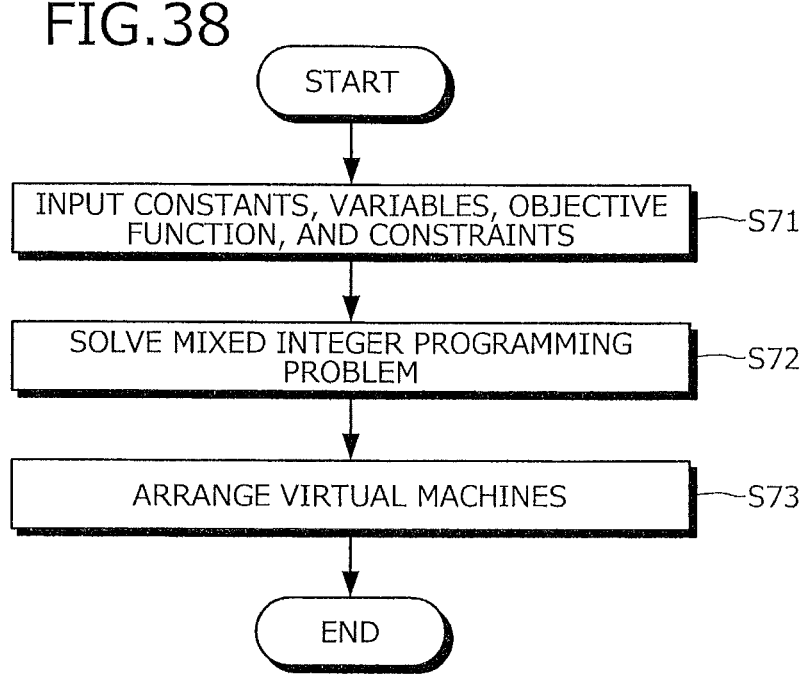
FIG. 38 is a flowchart of a virtual machine arranging method according to the seventh embodiment.

FIG. 38 is a flowchart of a virtual machine arranging method according to the seventh embodiment. As depicted in FIG. 38, when the arrangement of the virtual machines is started, the storing unit 32 inputs the data (the constants), the variables, the objective function, and the constraints into the solving unit 34 (step S71). The solving unit 34 solves the mixed integer programming problem using, for example, the solver, based on the data (the constants), the variables, the objective function, and the constraints that are input thereinto and the instruction from the determining unit 31; and obtains the solution (step S72). Formulation as the mixed integer programming problem will be described later. The arranging unit 35 arranges the virtual machines based on the solution obtained by the solving unit 34 (step S73). The series of process steps of the virtual machine arrangement process come to an end.

Formulation of the mixed integer programming problem according to the seventh embodiment will be described. Contents identical to those of the modeling described in each of the first to the fifth embodiments will not again be described.

The penalty for the startup stand-by time period is expressed by Eq. (119).

$$\sum_{i,j} b_{ij} \left( \sum_{m,n} \tau_{mn} x_{m,n,i,j} \right) \quad (119)$$

The penalty for the virtual machine down time is expressed by Eq. (120).

$$b \sum_{m,n} \tau_{mn} \left( \sum_{i,j} y_{m,n,i,j} \right) \quad (120)$$

In the above, "$y_{m,n,i,j}$" is a binary variable satisfying Eq. (121) below.

$$y_{m,n,i,j}: x_{m,n,i,j} - x_{m,n,i,j}^0 = 1 \Leftrightarrow y_{m,n,i,j} = 1 \quad (121)$$

$$x_{m,n,i,j} - x_{m,n,i,j}^0 \leq 0 \Leftrightarrow y_{m,n,i,j} = 0 \quad (122)$$

"$y_{m,n,i,j}$" takes a value of "one" when the n-th virtual machine in the m-th service moves to the j-th server in the i-th rack by the live migration, and takes a value of "zero" in other cases.

"$\Sigma y_{m,n,i,j}$" in Eq. (120) takes a value of "one" when the n-th virtual machine in the m-th service is migrated by live migration, and takes a value of "zero" in other cases.

Therefore, Eq. (120) expresses the total penalty for the down time generated by the migration of the n-th virtual machine in the m-th service by the live migration. The down time is proportional to the size $\tau_{mn}$.

"$\chi^0_{m,n,i,j}$" is a constant that represents the initial arrangement of the virtual machine. Here, $\chi^0_{m,n,i,j}$ is $\chi^0_{m,n,i,j}=1$ for n that is n≥$M_m$+1. "$M_m$" represents the number of virtual machines in the m-th service. In this case, the relation holds as below.

$$w_{ij}^0 = \Sigma_{m,n} \tau_{mn} x_{m,n,i,j}^0 \quad (123)$$

FIG. 39 is a diagram of a list of $\chi^0_{m,n,i,j}$ that represents the initial arrangement of the virtual machine. "$\chi^0_{m,n,i,j}$" is a constant that is determined based on the service number uniquely identifying the service, the VM number uniquely identifying the virtual machine, a rack number uniquely identifying the rack, and the server number uniquely identifying the server. In FIG. 39, definitions are made for those from $\chi^0_{1,1,1,1}$ concerning the first server in the first rack of the first virtual machine to be started up with the service number one to $\chi^0_{V,M,N,S}$ concerning the S-th server in the N-th rack of the M-th virtual machine to be started up among the service count V.

The penalty for the migration stand-by time period is expressed by Eq. (124).

$$e \sum_{i=1}^{N} \sum_{j=1}^{S} u_{ij} \quad (124)$$

"$u_{ij}$" is an integer variable that satisfies Eqs. (125) and (126) below and that is greater than or equal to zero and less than or equal to $L_{ij}$.

$$u_{ij}: \sum_{m,n} y_{m,n,i,j} \geq l \Rightarrow u_{ij} = \sum_{m,n} y_{m,n,i,j} \quad (125)$$

$$\sum_{m,n} y_{m,n,i,j} \leq l - 1 \Rightarrow u_{ij} = 0 \quad (126)$$

The left side of the inequality on the left of each of Eqs. (125) and (126) expresses the number of virtual machines migrated in the j-th server in the i-th rack. In Eq. (125), when the number of virtual machines migrated in the j-th server in the i-th rack is greater than or equal to one, $u_{ij}$ takes the value of the left side of the inequality on the left side of Eq. (125). On the other hand, in Eq. (126), when the number of virtual machines migrated in the j-th server in the i-th rack is less than or equal to l−1, $u_{ij}$ takes a value of zero. Therefore, "$e\chi u_{ij}$" represents the penalty for the stand-by time period for the virtual machines of a number by which the threshold value l is exceeded of the virtual machines moving in the j-th server in the i-th rack. Therefore, Eq. (124) expresses the total thereof.

"$\rho_{ij}$" is a binary variable that satisfies Eq. (127) below and is used to define "$u_{ij}$".

$$\rho_{ij}: \sum_{m,n} y_{m,n,i,j} \geq \ell \Rightarrow \rho_{ij} = 1 \quad (127)$$

Based on the above, the electric power minimization problem of the servers, the UPSs, the CRAC units, and the chiller plants by the rearrangement of the virtual machines can be formulated as a mixed integer programming problem as below.

Minimize $$\sum_{i=1}^{N} \left[ \eta_i + (1 + \varepsilon_i) \left\{ \sum_{j=1}^{S} \beta_{ij} v_{ij} + \alpha_{ij} \sum_{m,n} \tau_{mn} x_{m,n,i,j} \right\} \right] + \quad (128)$$

$$\sum_{k=1}^{C} (\lambda_k + \mu_k q_{in,CRAC,k}) + \sum_{k=1}^{C} (\kappa_k q_{out,CRAC,k}) +$$

$$c \left( \sum_{i=1}^{N} \sum_{j=1}^{S} \gamma_{ij}^- z_{ij}^- + \sum_{i=1}^{N} \sum_{j=1}^{S} \gamma_{ij}^+ z_{ij}^+ \right) + \sum_{i,j} b_{ij} \left( \sum_{m,n} \tau_{mn} x_{m,n,i,j} \right) +$$

$$b \sum_{m,n} \tau_{mn} \left( \sum_{i,j} y_{m,n,i,j} \right) + e \sum_{i=1}^{N} \sum_{j=1}^{S} u_{i,j}$$

Eq. (128) complies with the conditions expressed by Eqs. (129) to (135) in addition to the conditions expressed by Eqs. (88) to (107).

$$y_{m,n,i,j} \in \{0, 1\}, m = 1, \ldots, V, n = 1, \ldots, M, i = 1, \ldots, N, \quad (129)$$
$$j = 1, \ldots, S$$

$$\rho_{ij} \in \{0, 1\}, i = 1, \ldots, N, j = 1, \ldots, S \quad (130)$$

$$-1 + (1 + d) y_{m,n,i,j} \leq x_{m,n,i,j} - x_{m,n,i,j}^0 \leq y_{m,n,i,j} \quad (131)$$

$$m = 1, \ldots, V, n = 1, \ldots, M, i = 1, \ldots, N, j = 1, \ldots, S \quad (132)$$

$$d + (\ell - L_{ij} - d) \rho_{ij} \leq \ell - \sum_{m,n} y_{m,n,i,j} \leq \ell(1 - \rho_{ij}), i = 1, \ldots, N, \quad (133)$$
$$j = 1, \ldots, S$$

$$u_{ij} \leq L_{ij} \rho_{ij}, i = 1, \ldots, N, j = 1, \ldots, S \quad (134)$$

$$\sum_{m,n} y_{m,n,i,j} - L_{ij}(1 - \rho_{ij}) \leq u_{ij} \leq \sum_{m,n} y_{m,n,i,j}, i = 1, \ldots, N, \quad (135)$$
$$j = 1, \ldots, S$$

The mixed integer programming problem merely has to be solved such that the value of Eq. (128) is minimized. Eq. (128) is an equation formed by adding Eqs. (119), (120), and (124) to Eq. (87) described in the fifth embodiment. Eqs.

(119), (120), and (124) may be applied to Eq. (36) of the second embodiment, Eq. (59) of the third embodiment, Eq. (71) of the fourth embodiment, and Eq. (117) of the sixth embodiment. Not all of the Eqs. (119), (120), and (124) need to be used and any one thereamong may be used.

As described, the mixed integer programming problem formulated in the seventh embodiment is solved by the solver such as, for example, GLPK, SYMPHONY, or Gurobi Optimizer. The control apparatus of the computer system executes the migration of the virtual machines according to the solution obtained by the solver and rearranges the virtual machines; and thereby, can facilitate the electric power saving of the data center with consideration of reductions in the startup stand-by time period, the virtual machine down time, and the migration stand-by time period, respectively.

According to the computer system and the virtual machine arranging method, an effect is achieved that electric power saving can be facilitated when plural virtual machines are assigned to plural servers.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer system comprising:
   a plurality of servers in which virtual machines are arranged;
   a plurality of power supply apparatuses that supply electric power to the servers; and
   a control apparatus that controls arrangement of the virtual machines in the servers, wherein
   the control apparatus solves an integer programming problem whose objective function is total power consumption by the plurality of servers and by the plurality of power supply apparatuses, wherein the total power consumption is described as a function of the arrangement of the virtual machines; and
   the control apparatus arranges the virtual machines based on a solution of the integer programming problem, wherein
   for each of the plurality of servers, (a) power consumption due to virtual machines arranged in the server and (b) the greatest number of virtual machines executed by the server are set, wherein for each of the virtual machines, a unit size when the virtual machine operates is set,
   for each of the power supply apparatuses, power consumption is set according to (a) electric power continually consumed by the power supply apparatus and (b) electric power supplied to the servers by the power supply apparatus,
   the control apparatus formulates as the integer programming problem, an electric power saving problem of a data center that includes the servers, the power supply apparatuses, and the control apparatus by converting into a linear inequality, a logical expression concerning a variable indicating on or off of a server and a variable indicating the number of virtual machines arranged in the server, by using (a) a condition that the server is turned on if at least one virtual machine is arranged in the server and (b) a condition that the number of virtual machines arranged in the server does not exceed the greatest number of virtual machines, and
   the solution of the integer programming problem includes at least the number of virtual machines to be arranged in each of the servers.

2. The computer system according to claim 1, wherein the control apparatus solves the integer programming problem based on a premise, as one constraint, that all of the servers have suspended operation.

3. The computer system according to claim 2, wherein the objective function is a function expressing power consumption of the servers under an assumption that each of the virtual machines is of a different size.

4. The computer system according to claim 2, further comprising
   an air conditioning apparatus that conditions air for a space accommodating the servers and the power supply apparatuses, wherein
   the control apparatus solves a mixed integer programming problem whose objective function is the total power consumption further including power consumed by the air conditioning apparatus, the total power consumption being described as a function of the arrangement of the virtual machines; and
   the control apparatus arranges the virtual machines based on a solution of the mixed integer programming problem.

5. The computer system according to claim 2, wherein
   the servers are accommodated in and distributed among a plurality of racks, and
   the objective function includes a term to impose a penalty corresponding to a count of the racks in which the virtual machines are to be arranged.

6. The computer system according to claim 1, wherein the control apparatus solves the integer programming problem based on a premise, as one constraint, that at least one of the virtual machines has been arranged and additionally arranges the virtual machines thereto.

7. The computer system according to claim 1, wherein the control apparatus solves the integer programming problem, based on a premise, as one constraint, that at least one of the virtual machines has been arranged, and by using a power consumption obtained by adding, to the total power consumption, power consumed for migrating each virtual machine that has been arranged to another server; and the control apparatus rearranges each virtual machine that has been arranged.

8. The computer system according to claim 7, wherein the objective function includes a term to impose a penalty corresponding to a down time during which processes by the virtual machines are discontinued when each virtual machine that has been arranged is migrated to another server, the down time corresponding to a size of the virtual machine.

9. The computer system according to claim 1, wherein the objective function is a function that expresses power consumption by the servers under an assumption that each of the virtual machines is of a different size, and
   the control apparatus solves the integer programming problem, based on a premise, as one constraint, that at least one of the virtual machines has been arranged, and by using power consumption obtained by adding, to the total power consumption, power consumed for migrating each virtual machine that has been arranged to another server; and the control apparatus rearranges each virtual machine that has been arranged.

10. The computer system according to claim 1, wherein the objective function is a function that expresses power consumption of the servers under an assumption that each of the virtual machines is of a different size, the servers are accommodated in and distributed among a plurality of racks, and the objective function includes a term to impose a penalty corresponding to a count of the racks in which the virtual machines are to be arranged.

11. The computer system according to claim 1, wherein the objective function includes a term to impose a penalty corresponding to a stand-by time period elapsing until a time when rearrangement of the virtual machines in another server is complete, based on a count of the virtual machines to be migrated to the other server.

12. A computer system comprising:
a plurality of servers in which virtual machines are arranged;
a plurality of power supply apparatuses that supply electric power to the servers; and
a control apparatus that controls arrangement of the virtual machines in the servers, wherein
the control apparatus solves an integer programming problem whose objective function is total power consumption by the plurality of servers and by the plurality of power supply apparatuses, wherein the total power consumption is described as a function of the arrangement of the virtual machines; and
the control apparatus arranges the virtual machines based on a solution of the integer programming problem, wherein
the objective function includes a term to impose a penalty corresponding to a startup stand-by time period from a time when power of the server is turned on until a time when the virtual machines are able to be arranged in the servers.

13. A virtual machine arranging method of arranging virtual machines with respect to a plurality of servers that operate by electric power supplied from a plurality of power supply apparatuses, the virtual machine arranging method comprising:
solving an integer programming problem whose objective function is total power consumption by the plurality of servers and by the plurality of power supply apparatuses, wherein the total power consumption being described as a function of the arrangement of the virtual machines; and
arranging the virtual machines based on a solution of the integer programming problem, wherein
for each of the plurality of servers, (a) power consumption due to virtual machines arranged in the server and (b) the greatest number of virtual machines executed by the server are set, wherein for each of the virtual machines, a unit size when the virtual machine operates is set,
for each of the power supply apparatuses, power consumption is set according to (a) electric power continually consumed by the power supply apparatus and (b) electric power supplied to the servers by the power supply apparatus,
an electric power saving problem of a data center that includes the servers, the power supply apparatuses, and the control apparatus is formulated as the integer programming problem, by converting into a linear inequality, a logical expression concerning a variable indicating on or off of a server and a variable indicating the number of virtual machines arranged in the server, by using (a) a condition that the server is turned on if at least one virtual machine is arranged in the server and (b) a condition that the number of virtual machines arranged in the server does not exceed the greatest number of virtual machines, and
the solution of the integer programming problem includes at least the number of virtual machines to be arranged in each of the servers.

14. The virtual machine arranging method according to claim 13, wherein
the solving includes solving the integer programming problem based on a premise, as one constraint, that all of the servers have suspended operation.

15. The virtual machine arranging method according to claim 14, wherein
the objective function is a function expressing power consumption of the servers under an assumption that each of the virtual machines is of a different size.

16. The virtual machine arranging method according to claim 14, wherein
the solving includes solving a mixed integer programming problem whose objective function is the total power consumption further including power consumed by an air conditioning apparatus that conditions air for a space accommodating the servers and the power supply apparatuses, the total power consumption being described as a function of the arrangement of the virtual machines, and
the arranging includes arranging the virtual machines based on a solution of the mixed integer programming problem.

17. The virtual machine arranging method according to claim 14, wherein
the servers are accommodated in and distributed among a plurality of racks, and
the objective function includes a term to impose a penalty corresponding to a count of the racks in which the virtual machines are to be arranged.

18. The virtual machine arranging method according to claim 13, wherein
the solving includes solving the integer programming problem based on a premise, as one constraint, that at least one of the virtual machines has been arranged and additionally arranges the virtual machines thereto.

19. The virtual machine arranging method according to claim 13, wherein
the solving includes solving the integer programming problem, based on a premise, as one constraint, that at least one of the virtual machines has been arranged, and by using a power consumption obtained by adding, to the total power consumption, power consumed for migrating each virtual machine that has been arranged to another server, and
the arranging includes rearranging each virtual machine that has been arranged.

20. The virtual machine arranging method according to claim 19, wherein
the objective function includes a term to impose a penalty corresponding to a down time during which processes by the virtual machines are discontinued when each virtual machine that has been arranged is migrated to another server, the down time corresponding to a size of the virtual machine.

21. The virtual machine arranging method according to claim 13, wherein the objective function is a function that expresses power consumption by the servers under an assumption that each of the virtual machines is of a different size, and the solving includes solving the integer programming problem, based on a premise, as one constraint, that at least one of the virtual machines has been arranged, and by using power consumption obtained by adding, to the total power consumption, power consumed for migrating each virtual machine that has been arranged to another server, and the arranging includes rearranging each virtual machine that has been arranged.

22. The virtual machine arranging method according to claim 13, wherein the objective function is a function that expresses power consumption of the servers under an assumption that each of the virtual machines is of a different size, the servers are accommodated in and distributed among a plurality of racks, and the objective function includes a term to impose a penalty corresponding to a count of the racks in which the virtual machines are to be arranged.

23. The virtual machine arranging method according to claim 13, wherein the objective function includes a term to impose a penalty corresponding to a startup stand-by time period from a time when power of the server is turned on until a time when the virtual machines are able to be arranged in the servers.

24. The virtual machine arranging method according to claim 13, wherein the objective function includes a term to impose a penalty corresponding to a stand-by time period elapsing until a time when rearrangement of the virtual machines in another server is complete, based on a count of the virtual machines to be migrated to the other server.

* * * * *